United States Patent
Jin et al.

(10) Patent No.: US 10,635,447 B2
(45) Date of Patent: *Apr. 28, 2020

(54) SCATTER REDUCTION INSTRUCTION

(71) Applicant: Intel Corporation, Santa Clara, CA (US)

(72) Inventors: Jun Jin, Shanghai (CN); Elmoustapha Ould-Ahmed-Vall, Chandler, AZ (US)

(73) Assignee: Intel Corporation, Santa Clara, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 16/227,383

(22) Filed: Dec. 20, 2018

(65) Prior Publication Data

US 2019/0196841 A1    Jun. 27, 2019

Related U.S. Application Data

(63) Continuation of application No. 15/301,206, filed as application No. PCT/CN2015/098654 on Dec. 24, 2015, now Pat. No. 10,191,749.

(51) Int. Cl.

| | |
|---|---|
| *G06F 9/302* | (2018.01) |
| *G06F 15/80* | (2006.01) |
| *G06F 7/485* | (2006.01) |
| *G06F 9/38* | (2018.01) |
| *G06F 9/30* | (2018.01) |
| *G06F 7/498* | (2006.01) |

(52) U.S. Cl.
CPC ............. *G06F 9/3887* (2013.01); *G06F 9/30* (2013.01); *G06F 9/3001* (2013.01);
(Continued)

(58) Field of Classification Search
CPC ........ G06F 9/3887; G06F 9/30; G06F 9/3001; G06F 9/30018; G06F 9/30032;
(Continued)

(56) References Cited

U.S. PATENT DOCUMENTS

| 6,115,812 A * | 9/2000 | Abdallah ............ G06F 9/30014 |
| | | 708/520 |
| 10,191,749 B2 * | 1/2019 | Jin ............................ G06F 9/30 |

(Continued)

FOREIGN PATENT DOCUMENTS

| CN | 103460178 A | 12/2013 |
| CN | 103970509 A | 8/2014 |

(Continued)

OTHER PUBLICATIONS

International Search Report and Written Opinion on Application No. PCT/CN2015/098654, dated Sep. 22, 2016.

(Continued)

*Primary Examiner* — Daniel H Pan
(74) *Attorney, Agent, or Firm* — Lowenstein Sandler LLP

(57) ABSTRACT

Single Instruction, Multiple Data (SIMD) technologies are described. A processing device can include a processor core and a memory. The processor core can receive, from a software application, a request to perform an operation on a first set of variables that includes a first input value and a register value and perform the operation on a second set of variables that includes a second input value and the first register value. The processor core can vectorize the operation on the first set of variables and the second set of variables. The processor core can perform the operation on the first set of variables and the second set of variables in parallel to obtain a first operation value and a second operation value. The processor core can perform a horizontal add operation on the first operation value and the second operation value and write the result to memory.

20 Claims, 11 Drawing Sheets

(52) U.S. Cl.
CPC ........ *G06F 9/3016* (2013.01); *G06F 9/30036* (2013.01); *G06F 7/485* (2013.01); *G06F 7/4981* (2013.01); *G06F 9/30018* (2013.01); *G06F 9/30025* (2013.01); *G06F 9/30029* (2013.01); *G06F 9/30032* (2013.01); *G06F 9/30098* (2013.01); *G06F 15/8007* (2013.01)

(58) Field of Classification Search
CPC ............... G06F 9/30036; G06F 9/3016; G06F 9/30025; G06F 9/30029; G06F 7/485; G06F 7/4981; G06F 7/4985; G06F 9/4981; G06F 615/8007; G06F 9/8053; G06F 15/8053
USPC ...... 712/208, 4, 7, 9, 22, 221–225; 708/490, 708/507, 523, 524
See application file for complete search history.

(56) References Cited

U.S. PATENT DOCUMENTS

| | | | |
|---|---|---|---|
| 2003/0050941 A1* | 3/2003 | Roussel | G06F 9/30036 715/209 |
| 2004/0210616 A1* | 10/2004 | Debes | G06F 9/30014 708/523 |
| 2006/0095739 A1 | 5/2006 | Selvaggi et al. | |
| 2008/0288754 A1 | 11/2008 | Gonion et al. | |
| 2014/0013075 A1* | 1/2014 | Hagog | G06F 9/30036 712/4 |
| 2014/0025717 A1 | 1/2014 | Lyalin | |
| 2014/0189308 A1 | 7/2014 | Hughes et al. | |
| 2014/0189321 A1 | 7/2014 | Uliel et al. | |
| 2014/0281372 A1 | 9/2014 | Ingle | |

FOREIGN PATENT DOCUMENTS

| | | |
|---|---|---|
| CN | 104919416 A | 9/2015 |
| CN | 105009075 A | 10/2015 |
| EP | 0620533 A2 | 10/1994 |
| WO | 2013095658 A1 | 6/2013 |

OTHER PUBLICATIONS

Supplementary European Search Report application No. 15 91 1123, dated Oct. 7, 2019.

* cited by examiner

SCATTER REDUCTION INSTRUCTION

RELATED APPLICATIONS

This application is a continuation application of U.S. patent application Ser. No. 15/301,206, filed Sep. 30, 2016, which is a 35 U.S.C. § 371 Application of International Application No. PCT/CN2015/098654, filed Dec. 24, 2015, the entire contents of which are incorporated herein by reference.

BACKGROUND

Single Instruction, Multiple Data (SIMD) architectures can be implemented in microprocessor systems to enable one instruction to operate on several operands in parallel. SIMD architectures take advantage of packing multiple data elements within one register or contiguous memory location. With parallel hardware execution, multiple operations are performed on separate data elements by one instruction to increase a performance of the microprocessor systems.

BRIEF DESCRIPTION OF THE DRAWINGS

Various embodiments of the present invention will be understood more fully from the detailed description given below and from the accompanying drawings of various embodiments of the invention.

FIG. 2 illustrates a Single Instruction, Multiple Data (SIMD) instruction implementing the modified horizontal add operation according to one embodiment.

DESCRIPTION OF EMBODIMENTS

Figure 1A:
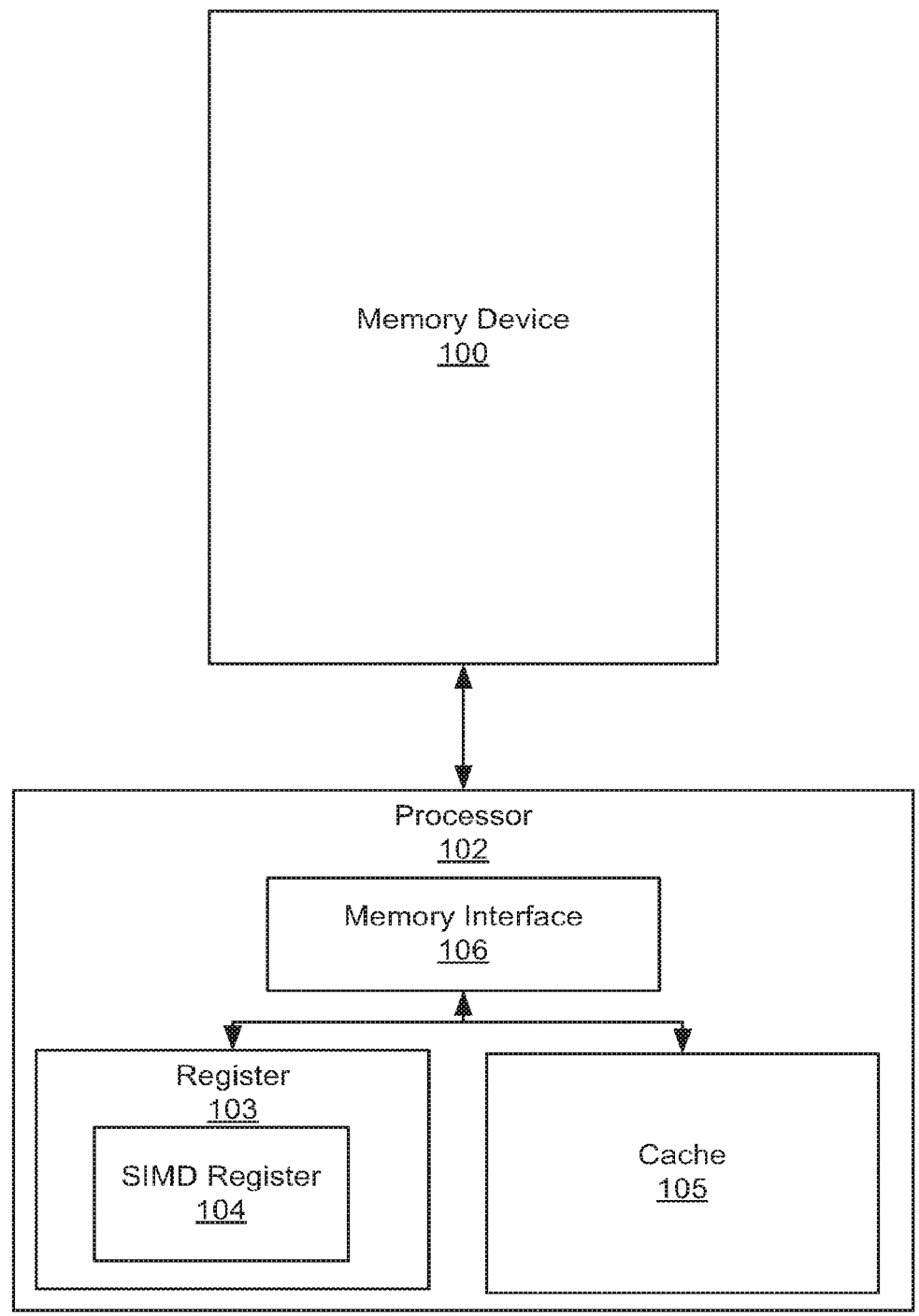
FIG. 1A illustrates a diagram of a memory device couple to a processor to perform a single instruction multiple data (SIMD) operation according to one embodiment.

Many processors use vector instruction sets or single instruction, multiple data (SIMD) instruction sets to perform multiple operations in parallel. A processor can perform multiple operations in parallel, simultaneously applying operations to the same piece of data or multiple pieces of data at the same time. Vectorization is an operation to convert a scalar program that only operates on one pair of operands at once to a vector program that can run multiple operations from a single instruction. For example, vectorization is a process of rewriting a loop operation to perform a SIMD instruction, where instead of processing a single element of an array N times, it processes M elements of the array simultaneously N/M times.

Vectorization can include an instruction (such as a sparse update instruction) to perform a gather operation, a modify operation, and a scatter operation. The gather operation and the scatter operation can indirectly access registers in a memory. For example, the gather operation uses indexed reads and the scatter operation uses indexed writes. In one example, the data elements may be at non-contiguous memory locations. The gather operation reads a set of data elements from the memory locations and aggregates the data elements into a single register or cache line. The modify operation modifies one or more of the data elements in the set of data elements. The scatter operation writes the data elements in a packed data structure to a set of non-contiguous or random memory locations.

Conventionally, processors using SIMD instruction sets have a limited performance increase because applications have irregular memory access patterns. For example, applications storing data tables that require frequent and random updates to data elements, are not be stored at contiguous memory locations and require rearrangement of the data in order to fully utilize SIMD instruction sets. The rearrangement of data causes a substantial overhead and limits an efficiency of using SIMD instruction sets.

Additionally, vectorization typically assumes that a single instruction performing the gather operation, the modify operation, and the scatter operation will access each memory location no more than once. In one example, a memory access pattern used by a union and sort algorithm (for 16 consecutive values of i) in an image search application can be vectorized as follows: gather 16 Array[a[i]]; do a SIMD computation, such as Array[a[i]]+=b[i]; and scatter the new values back. When two values of a[i] are the same, then after gather operation and the modify operation, the scatter operation for the second value of a[i] conflicts with the first value of a[i]. The conflict between the first and second values of a[i] causes a data dependency hazard. The data dependency hazard is where instructions refer to the results of preceding instructions that have not been completed yet. In one example, an SIMD instruction can have a data dependency hazard where a first operation is to add A and B to determine C and a second operation is to multiply C and D to determine E. In this example, the SIMD instruction performs the first and second operations at the same time and the data dependency hazard is caused by the second operation relying on the result of the first operation. The data dependency hazard can result in unpredictable results for the SIMD instruction set. In another example, when two consecutive values of are to be written to the same memory location (e.g., memory location a[i]), the scatter operation for the second value conflicts with the scatter operation for the first value. The simultaneous writing of multiple values to the same memory location may result in unpredictable answer, e.g., a lane conflict.

The embodiments described herein address the above noted deficiencies by using a horizontal add (VHADDCONFLICT) operation to eliminate the data dependency hazards for the SIMD instruction sets. The VHADDCONFLICT operation eliminates conflicting uses of data registers in a same memory location using an offset vector for the scatter operation. The VHADDCONFLICT operation can reduce (sum) values of the conflicting lanes or cells or an array for the same memory location using an offset vector for a scatter operation. For example, the VHADDCONFLICT operation can be a SIMD instruction to compute sequential models of computation (e.g., $y_i=y_i-1+x_i$ or $y_i=y_{i-1}+x_i$) simultaneously or in parallel during the modify operation to compute a single output value for the scatter operation. After the reduction of (sum) using the original offset vector, a write mask can be generated using a masking operation (VPCONFLICTMSK), as discussed in greater detail in the proceeding paragraphs. The mask is used to identify values to be written by the scatter operation that are a last occurrence of a reduction value in the case of a lane conflict or that are the values for the lanes with no conflict. For example, the VHADDCONFLICT operation can be performed on instructions such as Array[a[i]]+=b[i]. Conventionally, a horizontal add for Array[[a[i]]+=b[i] has a write dependency data hazard. The SIMD instruction employing the VHADDCONFLICT operation can avoid conflicts lanes causing the write dependency data hazard.

FIG. 1A illustrates a diagram of a memory device 100 couple to a processor 102 to perform an single instruction multiple data (SIMD) operation according to one embodiment. The processor 102 can include a memory interface 106, a register file 103, and a cache 105. The memory interface 106 can be coupled to the register 103 and to the cache 105.

The memory interface 106 can move data between the register file 103 or the cache 105 (for temporary storage) and the memory device 100 (for long term storage). In one example, the processor can use the register file 103 to store data used during instructions or processes performed by the processor 102. The processor can use the memory interface 106 to write data, such as results of the instructions or the processes, to the memory device 100 for future access. In another example, the register file 103 can include a SIMD register 104. The SIMD register 104 can store data used during a SIMD operation. For example, during a gather-modify-scatter operation, the processor 102 can use the memory interface 106 to gather data from the memory device 100 and store the data in the SIMD register 104 to be used during a SIMD operation (the gather operation), as discussed in greater detail in the proceeding paragraphs. The processor 102 can use the data stored at the SIMD register 104 during SIMD operations (the modify operation), such as addition or multiplication operations. When the SIMD operations are completed, the processor 102 can use the memory interface 106 to write the results of the SIMD operation back to the memory device 100 (the scatter operation). In another example, the memory interface 106 can store the results of the SIMD operation in the cache 105 for other operations of the processor 102.

Figure 1B:
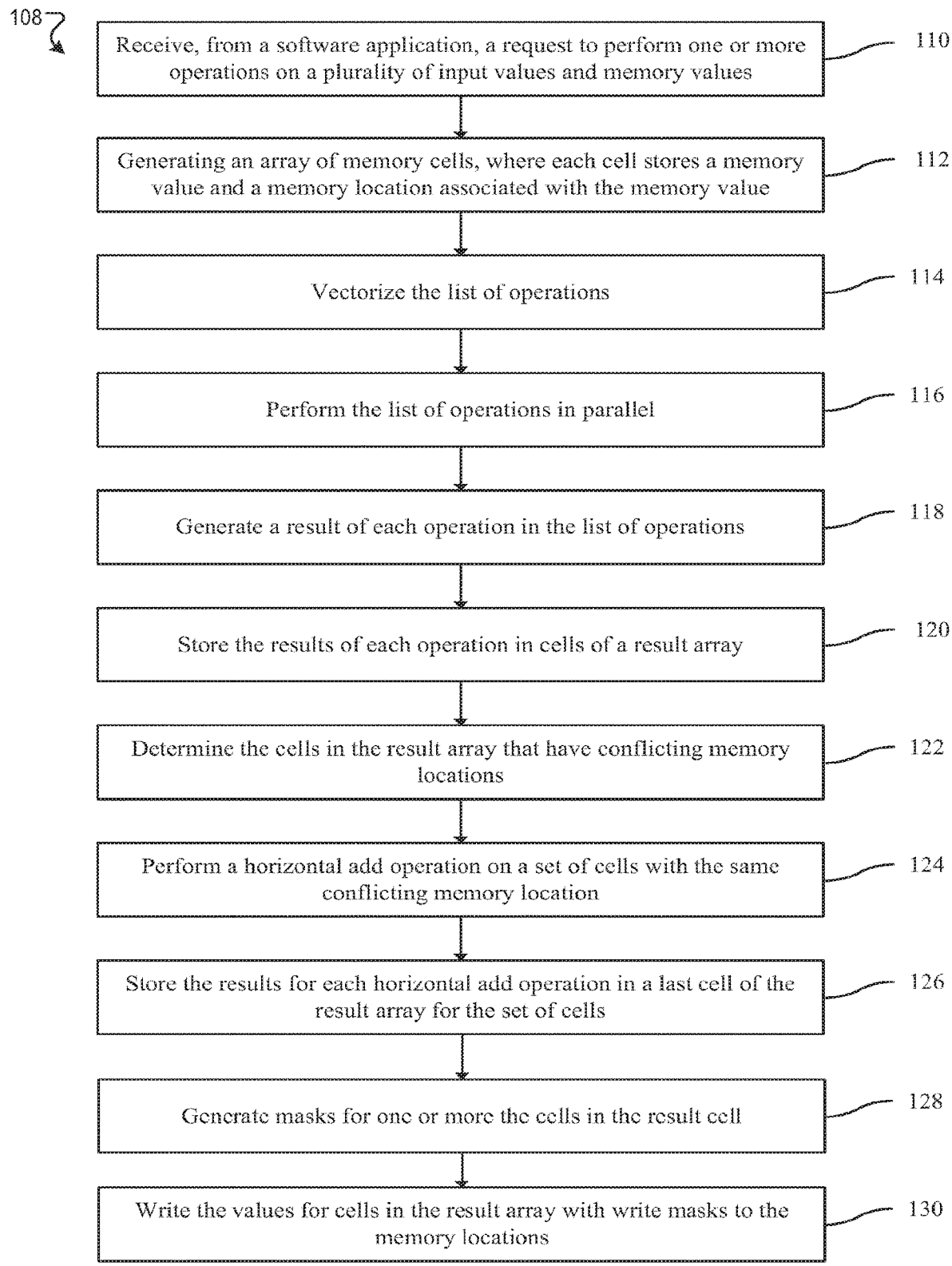
FIG. 1B illustrates a diagram of a method of performing a horizontal add operation on an array of values according to one embodiment.

FIG. 1B illustrates a diagram of a method 108 of performing a horizontal add operation on an array of values according to one embodiment. The method 100 may be at least partially performed by a processor 100 (FIG. 1A) or processing logic that may include hardware (e.g., circuitry, dedicated logic, programmable logic, microcode, etc.), software (e.g., instructions executed by a processing device), firmware or a combination thereof.

Referring to FIG. 1B, the method 108 begins with receiving, from a software application, a request to perform one or more operations on a plurality of input values and register values (110). In one embodiment, the register values are stored at various locations in memory. The instruction can include one or more of: an input array of input values from the software application; a list of locations in memory of the plurality of register values; and a list of operations. In another embodiment, each operation can designate an input value of the input array and a location of the register value for the operation. For example, the operation can be an addition operation of an input value and a register value. In this example, the operation can designate the input value in the array and the location of the register value in memory for the addition operation. In one example, different operations can use unique pairs of register value and input values. In another example, different operations can use the same register values with different input values.

The method can include generating an array of memory cells, where each cell stores a bit string (112). Each bit string includes a register value and a memory location associated with the register value. The method can include vectorizing the list of operations (114). Vectorizing the list of operations can enable a processor to perform the list of operations in parallel. The method can include performing the list of operations in parallel (116). For example, the processor can add a first input value in the input array with a first register value in the memory array, add a second input value in the input array with a second register value in the memory array, add a third input value in the input array with a third register value in the memory array, and so forth. The method can include generating a result of each operation in the list of operations (118). The result can include a result value from the operation and the location in memory for the register value of the operation. The method can include storing the results of the operations in cells of a result array (120). For example, the first result can be stored in a first cell of the result array, a second result can be stored in a second cell of the result array, and so forth.

The method can include determining the cells in the result array that have conflicting memory locations (122). The conflicting memory locations are locations in memory where multiple cells in the result array each refer to a same memory location associated with the register value. The method can include performing a horizontal add operation on a set of cells with register values that identify the same conflicting memory location (124). When there are multiple sets of cells with conflicting memory locations, the processor can perform the horizontal add operation for each set. The method can include storing the results for each horizontal add operation in a last cell of the result array for the set of cells (126). For example, the result array can include 2 sets of cells with conflicting memory locations, where the first set of cells includes 3 cells and the second cell includes 2 cells. The processor can perform a horizontal add operation for a first set of 3 cells with conflicting memory locations. The processor can store the result of the horizontal add operation in the third cell of the set of cells (e.g., the last cell). The processor can also perform a horizontal add operation for a second set of 2 cells with conflicting memory locations. The processor can store the result of the horizontal add operation in the second cell of the set of cells (e.g., the last cell).

The method can include generating masks for one or more cells in the result cell (128). The masks can include write masks and no-write masks. The write masks can indicate to write a value to memory and the no-write masks can indicate to not write a value to memory. In one embodiment, the processor can assign a write mask to each of the last cells of the set of result array with conflicting memory locations. In another embodiment, the processor can assign a write mask to each of cells in the result array that do not have conflicting memory locations. In another embodiment, the processor can assign a no-write mask to the cells of the set of result array with conflicting memory locations that are not the last cells in the set. For example, for a set of 3 cells with conflicting memory locations, the first and second cells of the set can be assigned a no-write mask and the third cell can be assigned a write mask. The method can include writing the values for cells in the result array with write masks to the memory locations (130).

Figure 1C:
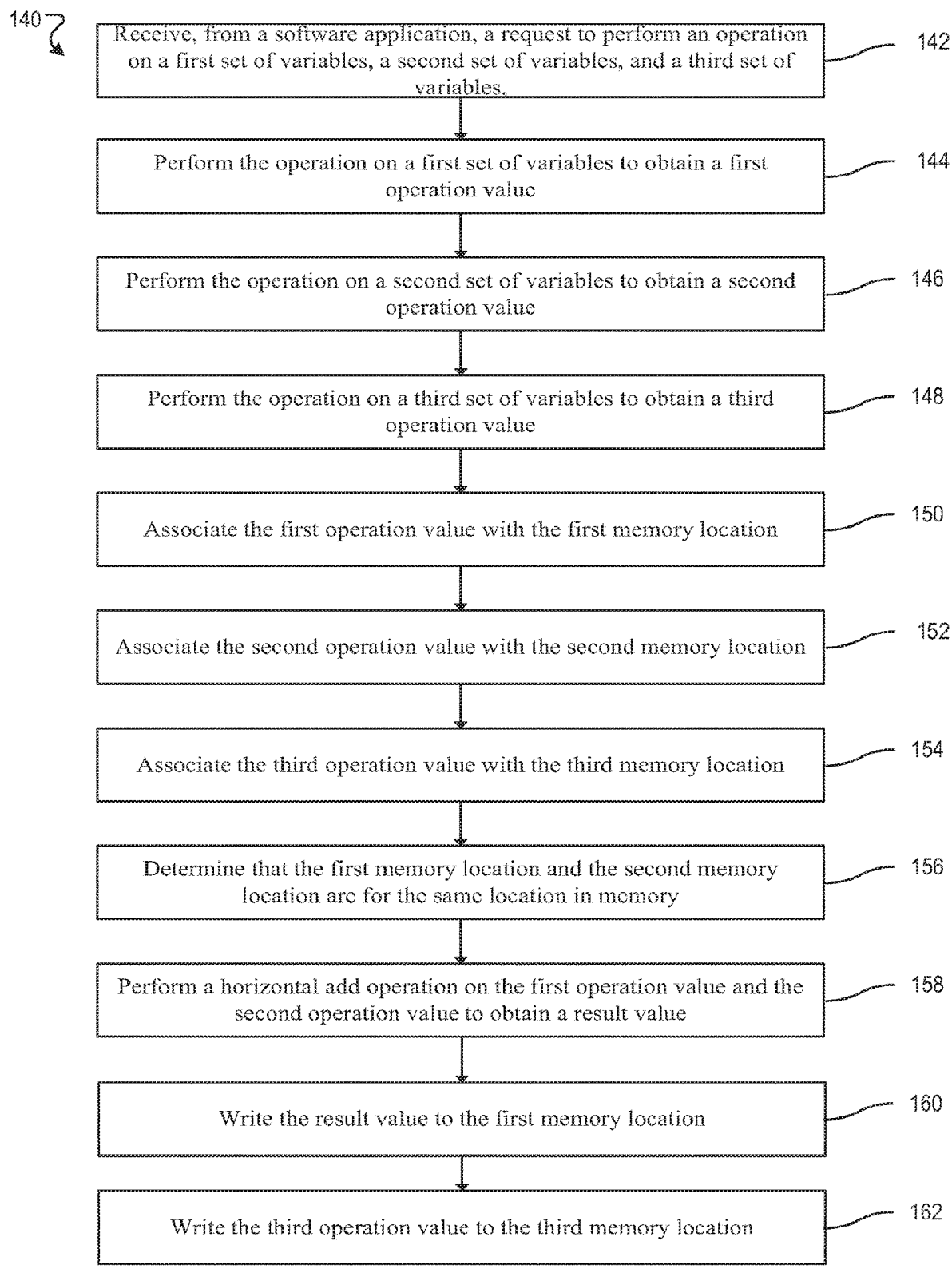
FIG. 1C illustrates a diagram of a method of performing a horizontal add operation on an array of values according to one embodiment.

FIG. 1C illustrates a diagram of a method 140 of performing a horizontal add operation on an array of values according to one embodiment. The method 100 may be at least partially performed by a processor 100 (FIG. 1A) or processing logic that may include hardware (e.g., circuitry, dedicated logic, programmable logic, microcode, etc.), software (e.g., instructions executed by a processing device), firmware or a combination thereof.

Referring to FIG. 1C, the method 140 begins with receive, from a software application, a request to perform an operation (142). In one example, the request can include performing the operation on a first set of variables, where the first set of variables includes a first input value and a first register value and the first register value is stored at a first memory location. In another example, the request can include performing the operation on a second set of variables, where the second set of variables includes a second input value and the first register value and the first register value is stored at a second memory location. In another example, the request can include performing the operation on a third set of variables, where the third set of variables includes a third input value and a second register value and the second register value is stored at a third memory location. The method can include performing the operation on the first set of variables to obtain a first operation value (144). The method can include performing the operation on the second set of variables to obtain a second operation value (146). The method can include performing the operation on the third set of variables to obtain a third operation value (148).

In one embodiment, the method can include generating a memory array of memory cells to store in a memory cache and storing: the first register value and the first memory location in a first memory cell in the memory array; the first register value and the first memory location in a second memory cell in the memory array; and the second register value and the second memory location in a third memory cell in the memory array. The method can also include: performing the operation on the first set of variables using the first register value in the first memory cell, performing the operation on the second set of variables using the first register value in the second memory cell, and performing the operation on the third set of variables using the second register value in the third memory cell. In another embodiment, to perform the operation on the first, second, and third set of variables can be performed in parallel. To perform the operation on the first, second, and third set of variables can be performed in parallel, the method can include, vectorizing, by the processing logic, the operation on the first set of variables, the operation on the second set of variables, and the operation on the third set of variables to perform the operation on the first, second, and third set of variables in parallel.

The method can include associating the first operation value with the first memory location (150). The method can include associating the second operation value with the second memory location (152). The method can include associating the third operation value with the third memory location (154). The method can include determining that the first memory location and the second memory location are for the same location in memory (156). The method can include performing a horizontal add operation on the first operation value and the second operation value to obtain a result value (158). In one example, the method can include generating an operation array of operation cells to store in the memory cache and storing: the first operation value and the first memory location in a first operation cell of the operation array; the second operation value and the second memory location in a second operation cell of the operation array; the third operation value and the third memory location in a third operation cell of the operation array. In this example, the method can also include determining that the first memory location for the first operation cell and the second memory location for the second operation cell are the same memory location and performing the horizontal add operation on first operations value and the second operations value in response to the first memory location for the first operation cell and the second memory location for the second operation cell being the same memory location The method can include writing the result value to the first memory location (160). The method can include writing the third operation value to the third memory location (162). In one example, the method can include storing the result of the horizontal add operation in the second operation cell of the operation array and generating a first write mask for second operation cell and a second write mask for third operation cell. In this example, the values in the operation cells with write masks can be written to the memory locations associated with the operation cells.

Figure 2:
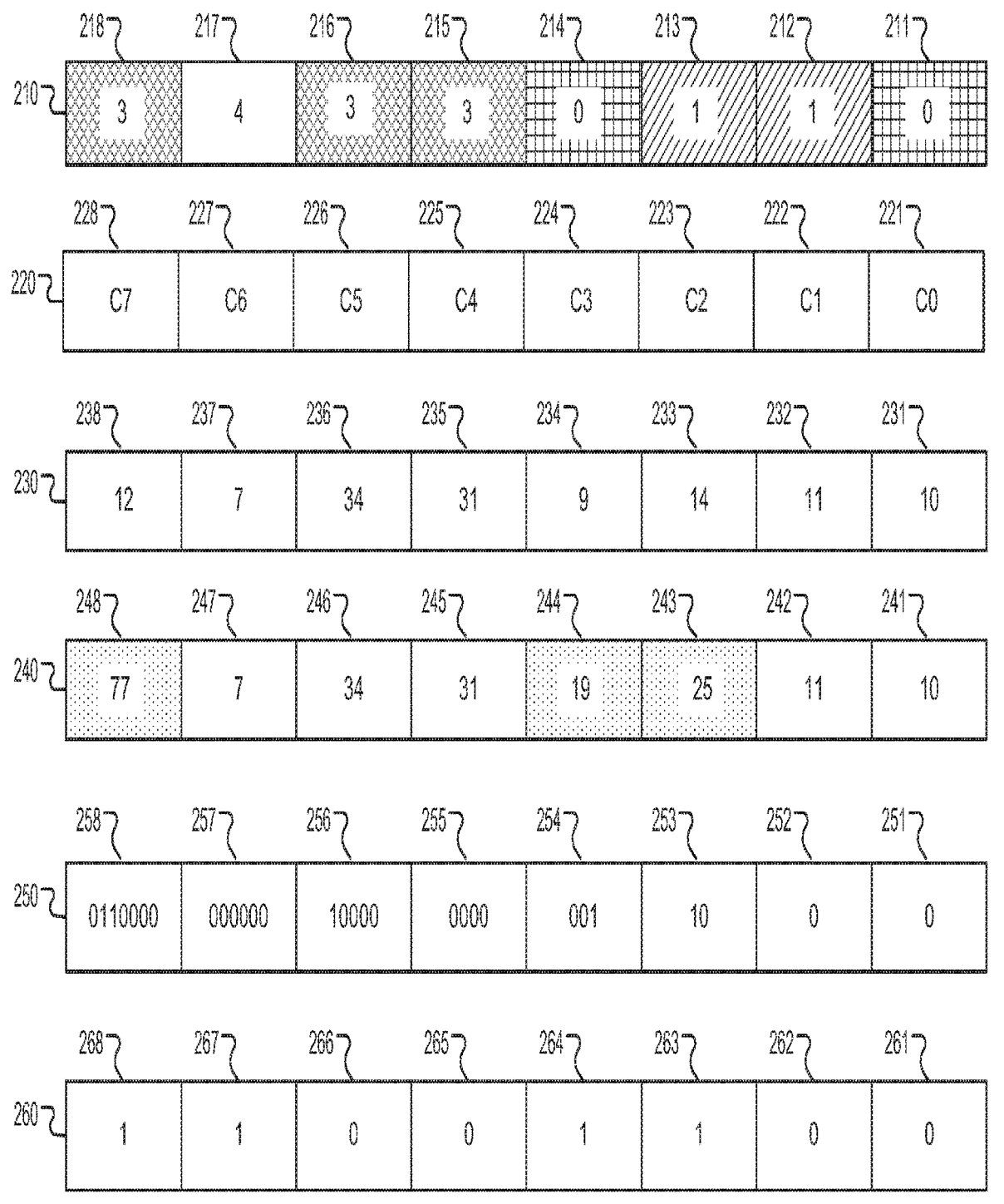

FIG. 2 illustrates an SIMD instruction implementing the modified horizontal add operation according to one embodiment. The SIMD instruction is an example of an implementation of the method described in FIG. 1A or 1B. In one example, the SIMD instruction can operate on a memory register with 8 memory locations. The SIMD instruction can include an bitmap generation operation to generate a bitmap, where the bitmap includes a bit vector that indicates which cells have conflicting memory locations.

Row 210 is an array of cells 211-218 that store values indicating locations in a memory (e.g., memory locations). The value in cell 211 represents location 0 in the memory, the value in cell 212 represents location 1 in the memory, the value in cell 213 represents location 1 in the memory, the value in cell 214 represents location 0 in the memory, the value in cell 215 represents location 3 in the memory, the value in cell 216 represents location 3 in the memory, the value in cell 216 represents location 3 in the memory, the value in cell 217 represents location 4 in the memory, and the value in cell 218 represents location 3 in the memory. Cells with the same memory location designations conflict with each other. For example, cell 211 conflicts with cell 214. Cell 212 conflicts with cell 213. Cell 215, cell 216, and cell 218 conflict with each other. Cell 217 does not conflict with any other cell in row 210.

Row 220 is an array of cells 221-228 that store input values from a software application for an operation on the values at corresponding memory locations 211-218. Row 230 is an array of cells 231-238 that store the result of the operation between cells 211-218 and corresponding cells 221-228. For example, the operation can be an addition of the value stored at the memory location associated with cells 211-218 and cells 221-228. In this example, cell 231 stores a value of 10, which is an addition of the value associated with cell 211 and the value stored at 221. Cell 232 stores a value of 11, which is an addition of the value associated with cell 212 and the value stored at 222. Cell 233 stores a value of 14, which is an addition of the value associated with cell 213 and the value stored at 223. Cell 234 stores a value of 9, which is an addition of the value associated with cell 214 and the value stored at 224. Cell 235 stores a value of 31, which is an addition of the value associated with cell 215 and the value stored at 225. Cell 236 stores a value of 34, which is an addition of the value associated with cell 216 and the value stored at 226. Cell 237 stores a value of 7, which is an addition of the value associated with cell 217 and the value stored at 227. Cell 238 stores a value of 12, which is an addition of the value associated with cell 218 and the value stored at 228. In one embodiment, when there are no conflicting lanes for the various memory locations corresponding to cells 211-218, each value stored in cells 231-238 can be written back to the memory locations corresponding to cells 211-218.

In another embodiment, when there are conflicting lanes for the various memory locations corresponding to cells 211-218, a VHADDCONFLICT operation can be performed to resolve the value that should be written back to the memory location for each of the conflicting lanes. The VHADDCONFLICT operation can take one or more values as source values and write the result of an addition of each conflicting memory location into a destination cell. For example, the VHADDCONFLICT instruction eliminates conflicts between multiple values to be scattered back to the same location in memory. For example, the values in cells 232 and 233 are both associated with memory location 1 as indicated by cells 212 and 213, respectively. To resolve the conflicting lanes, the VHADDCONFLICT operation can be performed to add each of the values for memory location 1 and stores the resulting value at the last cell of row 240 that corresponds to the conflicting lanes. For example, where the values in 11 (for cell 232) and 14 (for cell 233) each correspond to memory location 1, the values 11 and 14 can be added together to result in a value of 25 that is stored at cell 243 (the last cell for memory location 1).

In another example, the values in cells 231 and 234 are both associated with memory location 0 as indicated by cells 211 and 214, respectively. To resolve the conflicting lanes, the VHADDCONFLICT operation can be performed to add each of the values for memory location 0 together and store the resulting value at the last cell of row 240 that corresponds to the conflicting lanes. For example, where the values in 10 (for cell 231) and 9 (for cell 234) each correspond to memory location 0, the values 10 and 9 can be added together to result in a value of 19 that is stored at cell 244 (the last cell for memory location 1).

In another example, the values in cells 235, 236, and 238 are all associated with memory location 3 as indicated by cells 215, 216, and 218, respectively. To resolve the conflicting lanes, the VHADDCONFLICT operation can be performed to add each of the values for memory location 3 together and store the resulting value at the last cell of row 240 that corresponds to the conflicting lanes. For example, where the values in 31 (for cell 235), 34 (for cell 236), and 12 (for cell 238) each correspond to memory location 3, the values 31, 34, and 12 can be added together to result in a value of 77 that is stored at cell 248 (the last cell for memory location 3). In another example, the value in cell 237 is the only value associated with the memory location 4, so the value at cell 237 can be written to cell 247.

The following pseudo-code illustrates an example VHADDCONFLICT instruction.

```
VHADDREDUCE DEST SRC1 SRC2
// SRC1: original values to be scattered
// SRC2: offset vector
// DEST: output values, with reduce operation on conflicts.
(KL, VL) = (4, 128), (8, 256), (16, 512)
f[KL-1:0] ← 0xffff // check the current lane is already handled or not.
Initialize mask to 1
sum ← 0
For j ← 0 TO KL-1
    i ← j *32
    sum[j] ← sum[j] + SRC1[i+31 : i]
    FOR k ← j + 1 TO KL - 1
        m ← k * 32
        IF SRC2[m+31 : m] == SRC2[i+31 : i] AND f[k] != 1 THEN
            f[j] ← 0 //zero mask for current location since no last conflict
        FI
    ENDFOR
ENDFOR
For j ← 0 TO KL-1
    IF (f[j]) THEN DEST[BASE_ADDR + SRC2[j]] ← sum[j]
ENDFOR
```

When the VHADDCONFLICT operation has been performed, a VPCONFLICT operation can be performed to calculate a string of bit values that indicates when one or more memory locations associated with a cell preceding a current cell conflicts with the memory location associated with the current cell. A memory location conflicts when a memory location of the current cell is the same as a memory location of the preceding cell. A processor can determine if a memory location of the current cell conflicts with a memory location of a preceding cell by comparing a memory location associated with the current cell to a memory location associated with the preceding cell.

Each bit in the string is set when the corresponding comparison of a memory location associate with a current cell shows a conflict with a memory location associated with a previous cell. For example, the values in cells 251-258 of row 250 are strings of bit values. In one embodiment, each bit value in the string indicates when one or more memory locations associated with a cell preceding the current cell conflicts with the memory location associated with the current cell. In one embodiment, the bit values equal to is indicate cells storing memory locations that conflict with the memory location associated with the current cell. In another embodiment, 0s indicate cells storing memory locations that do not conflict with the memory location associated with the current cell. In another embodiment, a location of each bit value in a string of bit values of a cell indicates a location of the conflicting cell in the array 210.

For example, cell 251 correlates to cell 211 and indicates whether any cells preceding cell 211 conflict with cell 211. Where cell 211 is the first cell in the array 210, no cells precede cell 211 so there are no conflicting cells that precede cell 211. In one embodiment, the bit string value in cell 251 is 0. In another embodiment, the bit string value in cell 251 is blank.

Cell 252 correlates to cell 212 and indicates whether any cells preceding cell 212 conflict with cell 212. Cell 211 designates location 0 in the memory and cell 212 designates location 1 in memory. The preceding cell 211 does not conflict with the current cell 212 (e.g., a bit value of 0). Accordingly, the bit string value in cell 252 is 0.

Cell 253 correlates to cell 213 and indicates whether any cells preceding cell 213 conflict with cell 213. Cell 211 designates location 0 in the memory, cell 212 designates location 1 in memory, and cell 213 designates location 1 in the memory. The preceding cell 212 conflicts the current cell 213 (e.g., a bit value of 1) and the preceding cell 211 does not conflict with the current cell 213 (e.g., a bit value of 0). Accordingly, the bit string value in cell 253 is 10.

Cell 254 correlates to cell 214 and indicates whether any cells preceding cell 214 conflict with cell 214. Cell 211 designates location 0 in the memory, cell 212 designates location 1 in memory, cell 213 designates location 1 in the memory, and cell 214 designates location 0 in the memory. The preceding cell 213 does not conflicts the current cell 214 (e.g., a bit value of 0), cell 212 does not conflict with the current cell 214 (e.g., a bit value of 0), and cell 211 conflicts with the current cell 214 (e.g., a bit value of 1). Accordingly, the bit string value in cell 254 is 001.

Cell 255 correlates to cell 215 and indicates whether any cells preceding cell 215 conflict with cell 215. Cell 211 designates location 0 in the memory, cell 212 designates location 1 in memory, cell 213 designates location 1 in the memory, cell 214 designates location 0 in the memory, and cell 215 designates location 3 in the memory. The preceding cell 214 does not conflicts the current cell 215 (e.g., a bit value of 0), cell 213 does not conflict with the current cell 215 (e.g., a bit value of 0), cell 212 does not conflict with the current cell 215 (e.g., a bit value of 0), and cell 211 does not conflict with the current cell 215 (e.g., a bit value of 0). Accordingly, the bit string value in cell 255 is 0000.

Cell 256 correlates to cell 216 and indicates whether any cells preceding cell 216 conflict with cell 216. Cell 211 designates location 0 in the memory, cell 212 designates location 1 in memory, cell 213 designates location 1 in the memory, cell 214 designates location 0 in the memory, cell 215 designates location 3 in the memory, and cell 216 designates location 3 in the memory. The preceding cell 215 conflicts the current cell 216 (e.g., a bit value of 1), cell 214 does not conflict with the current cell 216 (e.g., a bit value of 0), cell 213 does not conflict with the current cell 216 (e.g., a bit value of 0), cell 212 does not conflict with the current cell 216 (e.g., a bit value of 0), and cell 211 does not conflict with the current cell 216. Accordingly, the bit string value in cell 256 is 10000.

Cell 257 correlates to cell 217 and indicates whether any cells preceding cell 217 conflict with cell 217. Cell 211 designates location 0 in the memory, cell 212 designates location 1 in memory, cell 213 designates location 1 in the memory, cell 214 designates location 0 in the memory, cell 215 designates location 3 in the memory, cell 216 designates location 3 in the memory, and cell 217 designates location 4 in the memory. The preceding cell 216 does not conflicts the current cell 217 (e.g., a bit value of 0), cell 215 does not conflict with the current cell 217 (e.g., a bit value of 0), cell 214 does not conflict with the current cell 217 (e.g., a bit value of 0), cell 213 does not conflict with the current cell 217 (e.g., a bit value of 0), cell 212 does not conflict with the current cell 217, and cell 211 does not conflict with the current cell 217. Accordingly, the bit string value in cell 257 is 00000.

Cell 258 correlates to cell 218 and indicates whether any cells preceding cell 218 conflict with cell 218. Cell 211 designates location 0 in the memory, cell 212 designates location 1 in memory, cell 213 designates location 1 in the memory, cell 214 designates location 0 in the memory, cell 215 designates location 3 in the memory, cell 216 designates location 3 in the memory, cell 217 designates location 4 in the memory, and cell 218 designates location 3 in the memory. The preceding cell 217 does not conflicts the current cell 218 (e.g., a bit value of 0), cell 216 conflicts with the current cell 218 (e.g., a bit value of 1), cell 215 conflicts with the current cell 218 (e.g., a bit value of 1), cell 214 does not conflict with the current cell 218 (e.g., a bit value of 0), cell 213 does not conflict with the current cell 218 (e.g., a bit value of 0), cell 212 does not conflict with the current cell 218 (e.g., a bit value of 0), and cell 211 does not conflict with the current cell 218 (e.g., a bit value of 0). Accordingly, the bit string value in cell 258 is 0110000.

When the string of bits has been generated for each cell 251-258, a VPCONFLICT operation can be performed to generate masks to indicate the cells storing values to write to memory in a scatter operation. In one embodiment, a bit value of 1 designates that a value stored in a corresponding cell 241-248 is to be written memory and a bit value of 0 designates that a value stored in a corresponding cell 241-248 is not to be written memory.

In one example, the values in cells 251-258 of row 250 store strings of bit values. In one embodiment, each bit value in a cell indicates which cells 241-248 of row 240 contain the last value for a memory location associated with the cells 211-218 of row 210. Only the cells with no conflicts and the lasts cells for conflicting memory locations have a masking bit set from them. In one embodiment, a 0 bit designates that a cell does not store the last value for a memory location and a 1 bit designates that a cell store the last value for a memory location. For example, cell 261 includes a bit value of 0 designating that cell 241 does not store a last sequential value for memory location 0. Cell 262 includes a bit value of 0 designating that cell 242 does not store a last sequential value for memory location 1. Cell 263 includes a bit value of 1 designating that cell 243 stores a last sequential value for memory location 1, e.g., the last value of the memory locations for the cells 211-218 for memory location 1. Cell 264 includes a bit value of 1 designating that cell 264 stores a last sequential value for memory location 0, e.g., the last value of the memory locations for the cells 211-218 that are for memory location 0. Cell 265 includes a bit value of 0 designating that cell 245 does not store a last value for memory location 3. Cell 266 includes a bit value of 0 designating that cell 246 does not store a last value for memory location 3. Cell 267 includes a bit value of 1 designating that cell 247 stores a last sequential value for memory location 4, e.g., the last value of the memory locations for the cells 211-218 that are for memory location 4. Cell 268 includes a bit value of 1 designating that cell 248 stores a last sequential value for memory location 3, e.g., the last value of the memory locations for the cells 211-218 that are for memory location 3.

The processing device can execute the scatter operation to write to memory the values in cells 241-248 that are associated with the cells 261-268 that store masking bits with a value of 1. For example, cell 261 has a masking bit with a value of 0, so the value of 10 stored at cell 241 is not written to memory location 0. Cell 262 has a masking bit with a value of 0, so the value of 11 stored at cell 242 is not written to memory location 1. Cell 263 has a masking bit with a value of 1, so the value of 25 stored at cell 243 is written to memory location 1. Cell 264 has a masking bit with a value of 1, so the value of 19 stored at cell 244 is written to memory location 0. Cell 265 has a masking bit with a value of 0, so the value of 31 stored at cell 245 is not written to memory location 3. Cell 266 has a masking bit with a value of 0, so the value of 34 stored at cell 246 is not written to memory location 3. Cell 267 has a masking bit with a value of 1, so the value of 7 stored at cell 246 is written to memory location 4. Cell 268 has a masking bit with a value of 1, so the value of 77 stored at cell 247 is written to memory location 3.

Figure 3A:
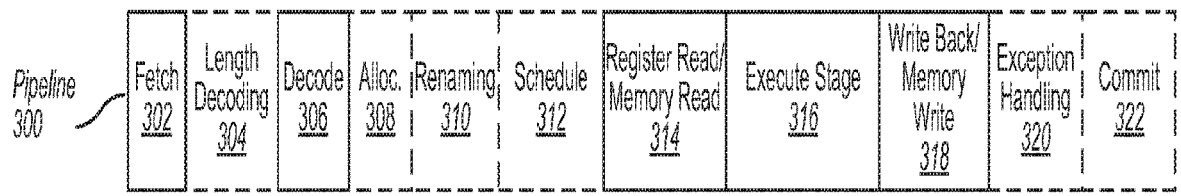
FIG. 3A is a block diagram illustrating an in-order pipeline and a register renaming stage, out-of-order issue/execution pipeline according to one embodiment.

FIG. 3A is a block diagram illustrating is a block diagram illustrating an in-order pipeline and a register renaming stage, out-of-order issue/execution pipeline implemented by processor 300 according to some embodiments of the disclosure. The solid lined boxes in FIG. 3A illustrate an in-order pipeline, while the dashed lined boxes illustrates a register renaming, out-of-order issue/execution pipeline. Specifically, processor 300 depicts an in-order architecture core and a register renaming logic, out-of-order issue/execution logic to be included in a processor according to at least one embodiment of the disclosure.

In FIG. 3A, the pipeline includes a fetch stage 302, a length decode stage 304, a decode stage 306, an allocation stage 308, a renaming stage 310, a scheduling (also known as a dispatch or issue) stage 312, a register read/memory read stage 314, an execute stage 316, a write back/memory write stage 318, an exception handling stage 322, and a commit stage 324. In some embodiments, the ordering of stages 302-324 may be different than illustrated and are not limited to the specific ordering shown in FIG. 3A.

Figure 3B:
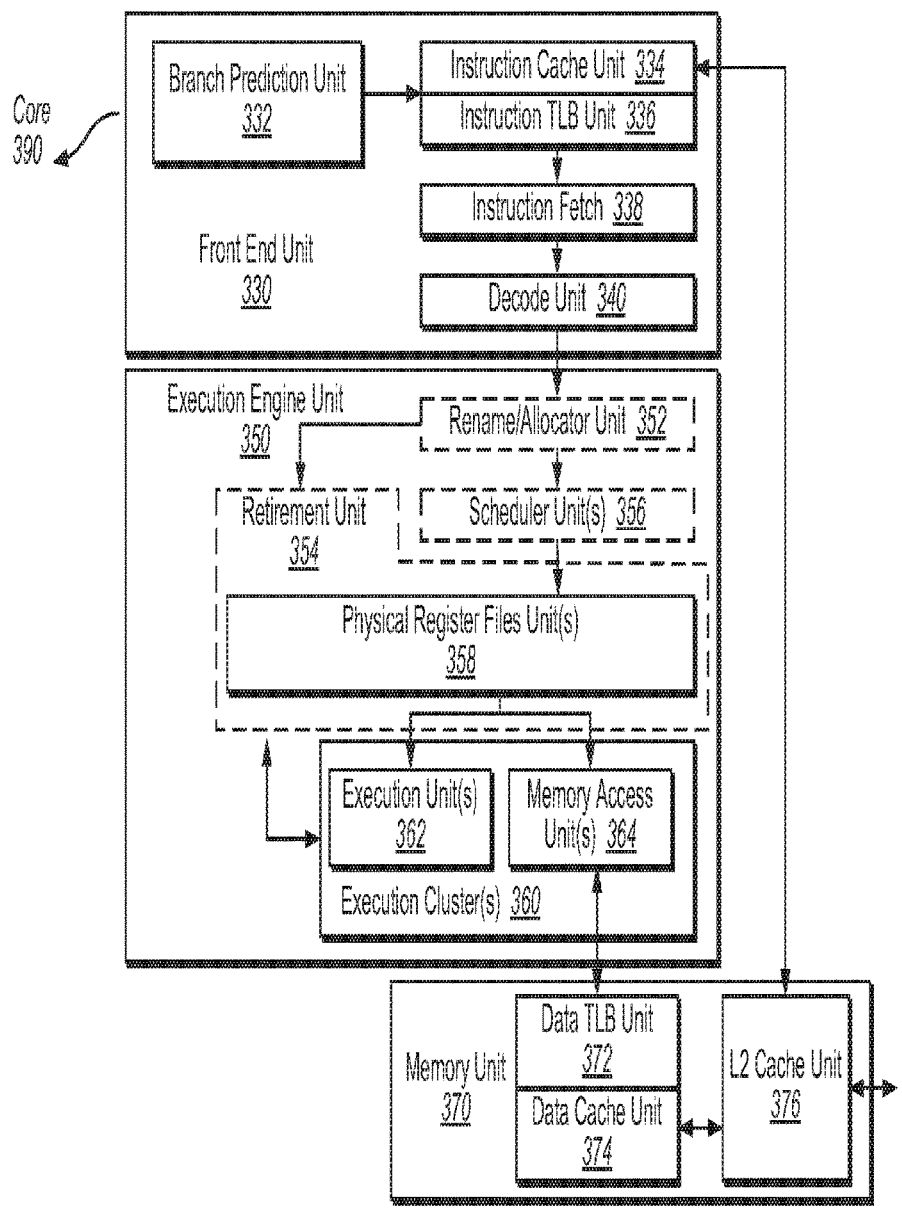
FIG. 3B is a block diagram illustrating a micro-architecture for a processor that implements secure memory repartitioning according to one embodiment.

FIG. 3B is a block diagram illustrating a micro-architecture for a processor 300 that implements dynamic cache hash changes between SNCs according to one embodiment. Processor 300 includes a front end unit 330 coupled to an execution engine unit 350, and both are coupled to a memory unit 370. The processor 300 may include a reduced instruction set computing (RISC) core, a complex instruction set computing (CISC) core, a very long instruction word (VLIW) core, or a hybrid or alternative core type. As yet another option, processor 300 may include a special-purpose core, such as, for example, a network or communication core, compression engine, graphics core, or the like. In one embodiment, processor 300 may be a multi-core processor or may be part of a multi-processor system. The embodiments of the page additions and content copying can be implemented in processor 300.

The front end unit 330 includes a branch prediction unit 332 coupled to an instruction cache unit 334, which is coupled to an instruction translation lookaside buffer (TLB) 336, which is coupled to an instruction fetch unit 338, which is coupled to a decode unit 340. The decode unit 340 (also known as a decoder) may decode instructions, and generate as an output one or more micro-operations, micro-code entry points, microinstructions, other instructions, or other control signals, which are decoded from, or which otherwise reflect, or are derived from, the original instructions. The decoder 340 may be implemented using various different mechanisms. Examples of suitable mechanisms include, but are not limited to, look-up tables, hardware implementations, programmable logic arrays (PLAs), microcode read only memories (ROMs), etc. The instruction cache unit 334 is further coupled to the memory unit 370. The decode unit 340 is coupled to a rename/allocator unit 352 in the execution engine unit 350.

The execution engine unit 350 includes the rename/allocator unit 352 coupled to a retirement unit 354 and a set of one or more scheduler unit(s) 356. The scheduler unit(s) 356 represents any number of different schedulers, including reservations stations (RS), central instruction window, etc. The scheduler unit(s) 356 is coupled to the physical register file(s) unit(s) 358. Each of the physical register file(s) units 358 represents one or more physical register files, different ones of which store one or more different data types, such as scalar integer, scalar floating point, packed integer, packed floating point, vector integer, vector floating point, etc., status (e.g., an instruction pointer that is the address of the next instruction to be executed), etc. The physical register file(s) unit(s) 358 is overlapped by the retirement unit 354 to illustrate various ways in which register renaming and out-of-order execution may be implemented (e.g., using a reorder buffer(s) and a retirement register file(s), using a future file(s), a history buffer(s), and a retirement register file(s); using a register maps and a pool of registers; etc.).

Generally, the architectural registers are visible from the outside of the processor or from a programmer's perspective. The registers are not limited to any known particular type of circuit. Various different types of registers are suitable as long as they are capable of storing and providing data as described herein. Examples of suitable registers include, but are not limited to, dedicated physical registers, dynamically allocated physical registers using register renaming, combinations of dedicated and dynamically allocated physical registers, etc. The retirement unit 354 and the physical register file(s) unit(s) 358 are coupled to the execution cluster(s) 360. The execution cluster(s) 360 includes a set of one or more execution units 362 and a set of one or more memory access units 364. The execution units 362 may perform various operations (e.g., shifts, addition, subtraction, multiplication) and operate on various types of data (e.g., scalar floating point, packed integer, packed floating point, vector integer, vector floating point).

While some embodiments may include a number of execution units dedicated to specific functions or sets of functions, other embodiments may include only one execution unit or multiple execution units that all perform all functions. The scheduler unit(s) 356, physical register file(s) unit(s) 358, and execution cluster(s) 360 are shown as being possibly plural because certain embodiments create separate pipelines for certain types of data/operations (e.g., a scalar integer pipeline, a scalar floating point/packed integer/packed floating point/vector integer/vector floating point pipeline, and/or a memory access pipeline that each have their own scheduler unit, physical register file(s) unit, and/or execution cluster—and in the case of a separate memory access pipeline, certain embodiments are implemented in which only the execution cluster of this pipeline has the memory access unit(s) 364). It should also be understood that where separate pipelines are used, one or more of these pipelines may be out-of-order issue/execution and the rest in-order.

The set of memory access units 364 is coupled to the memory unit 370, which may include a data prefetcher 380, a data TLB unit 372, a data cache unit (DCU) 374, and a level 2 (L2) cache unit 376, to name a few examples. In some embodiments DCU 374 is also known as a first level data cache (L1 cache). The DCU 374 may handle multiple outstanding cache misses and continue to service incoming stores and loads. It also supports maintaining cache coherency. The data TLB unit 372 is a cache used to improve virtual address translation speed by mapping virtual and physical address spaces. In one exemplary embodiment, the memory access units 364 may include a load unit, a store address unit, and a store data unit, each of which is coupled to the data TLB unit 372 in the memory unit 370. The L2 cache unit 376 may be coupled to one or more other levels of cache and eventually to a main memory.

In one embodiment, the data prefetcher 380 speculatively loads/prefetches data to the DCU 374 by automatically predicting which data a program is about to consume. Prefetching may refer to transferring data stored in one memory location (e.g., position) of a memory hierarchy (e.g., lower level caches or memory) to a higher-level memory location that is closer (e.g., yields lower access latency) to the processor before the data is actually demanded by the processor. More specifically, prefetching may refer to the early retrieval of data from one of the lower level caches/memory to a data cache and/or prefetch buffer before the processor issues a demand for the specific data being returned.

The processor 300 may support one or more instructions sets (e.g., the x86 instruction set (with some extensions that have been added with newer versions); the MIPS instruction set of MIPS Technologies of Sunnyvale, Calif.; the ARM instruction set (with optional additional extensions such as NEON) of ARM Holdings of Sunnyvale, Calif.).

It should be understood that the core may support multi-threading (executing two or more parallel sets of operations or threads), and may do so in a variety of ways including time sliced multithreading, simultaneous multithreading (where a single physical core provides a logical core for each of the threads that physical core is simultaneously multi-threading), or a combination thereof (e.g., time sliced fetching and decoding and simultaneous multithreading thereafter such as in the Intel® Hyperthreading technology).

While register renaming is described in the context of out-of-order execution, it should be understood that register renaming may be used in an in-order architecture. While the illustrated embodiment of the processor also includes a separate instruction and data cache units and a shared L2 cache unit, alternative embodiments may have a single internal cache for both instructions and data, such as, for example, a Level 1 (L1) internal cache, or multiple levels of internal cache. In some embodiments, the system may include a combination of an internal cache and an external cache that is external to the core and/or the processor. Alternatively, all of the cache may be external to the core and/or the processor.

Figure 4:
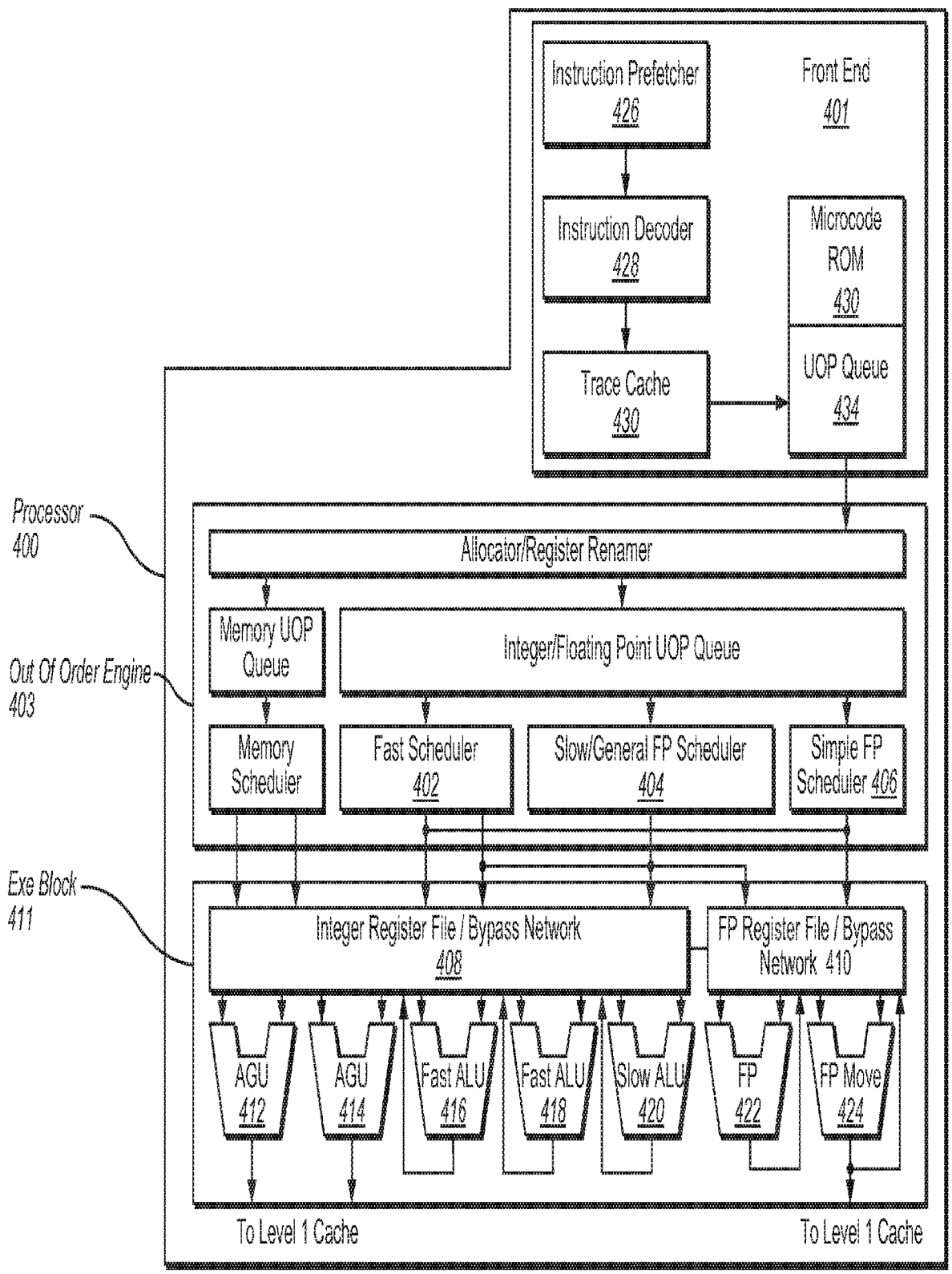
FIG. 4 illustrates a block diagram of the micro-architecture for a processor that includes logic circuits to perform secure memory repartitioning according to one embodiment.

FIG. 4 illustrates a block diagram of the micro-architecture for a processor 400 that includes logic circuits to perform dynamic cache hash changes between SNCs according to one embodiment. In some embodiments, an instruction in accordance with one embodiment can be implemented to operate on data elements having sizes of byte, word, doubleword, quadword, etc., as well as datatypes, such as single and double precision integer and floating point datatypes. In one embodiment the in-order front end 401 is the part of the processor 400 that fetches instructions to be executed and prepares them to be used later in the processor pipeline. The embodiments of the page additions and content copying can be implemented in processor 400.

The front end 401 may include several units. In one embodiment, the instruction prefetcher 416 fetches instructions from memory and feeds them to an instruction decoder 418 which in turn decodes or interprets them. For example, in one embodiment, the decoder decodes a received instruction into one or more operations called "micro-instructions" or "micro-operations" (also called micro op or uops) that the machine can execute. In other embodiments, the decoder parses the instruction into an opcode and corresponding data and control fields that are used by the micro-architecture to perform operations in accordance with one embodiment. In one embodiment, the trace cache 430 takes decoded uops and assembles them into program ordered sequences or traces in the uop queue 434 for execution. When the trace cache 430 encounters a complex instruction, the microcode ROM 432 provides the uops needed to complete the operation.

Some instructions are converted into a single micro-op, whereas others need several micro-ops to complete the full operation. In one embodiment, if more than four micro-ops are needed to complete an instruction, the decoder 418 accesses the microcode ROM 432 to do the instruction. For one embodiment, an instruction can be decoded into a small number of micro ops for processing at the instruction decoder 418. In another embodiment, an instruction can be stored within the microcode ROM 432 should a number of micro-ops be needed to accomplish the operation. The trace cache 430 refers to an entry point programmable logic array (PLA) to determine a correct micro-instruction pointer for reading the micro-code sequences to complete one or more instructions in accordance with one embodiment from the micro-code ROM 432. After the microcode ROM 432 finishes sequencing micro-ops for an instruction, the front end 401 of the machine resumes fetching micro-ops from the trace cache 430.

The out-of-order execution engine 403 is where the instructions are prepared for execution. The out-of-order execution logic has a number of buffers to smooth out and re-order the flow of instructions to optimize performance as they go down the pipeline and get scheduled for execution. The allocator logic allocates the machine buffers and resources that each uop needs in order to execute. The register renaming logic renames logic registers onto entries in a register file. The allocator also allocates an entry for each uop in one of the two uop queues, one for memory operations and one for non-memory operations, in front of the instruction schedulers: memory scheduler, fast scheduler 402, slow/general floating point scheduler 404, and simple floating point scheduler 406. The uop schedulers 402, 404, 406, determine when a uop is ready to execute based on the readiness of their dependent input register operand sources and the availability of the execution resources the uops need to complete their operation. The fast scheduler 402 of one embodiment can schedule on each half of the main clock cycle while the other schedulers can only schedule once per main processor clock cycle. The schedulers arbitrate for the dispatch ports to schedule uops for execution.

Register files 408, 410, sit between the schedulers 402, 404, 406, and the execution units 412, 414, 416, 418, 420, 422, 424 in the execution block 411. There is a separate register file 408, 410, for integer and floating point operations, respectively. Each register file 408, 410, of one embodiment also includes a bypass network that can bypass or forward just completed results that have not yet been written into the register file to new dependent uops. The integer register file 408 and the floating point register file 410 are also capable of communicating data with the other. For one embodiment, the integer register file 408 is split into two separate register files, one register file for the low order 32 bits of data and a second register file for the high order 32 bits of data. The floating point register file 410 of one embodiment has 128 bit wide entries because floating point instructions typically have operands from 64 to 128 bits in width.

The execution block 411 contains the execution units 412, 414, 416, 418, 420, 422, 424, where the instructions are actually executed. This section includes the register files 408, 410, that store the integer and floating point data operand values that the micro-instructions need to execute. The processor 400 of one embodiment is comprised of a number of execution units: address generation unit (AGU) 412, AGU 414, fast ALU 416, fast ALU 418, slow ALU 420, floating point ALU 422, floating point move unit 424. For one embodiment, the floating point execution blocks 412, 414, execute floating point, MMX, SIMD, and SSE, or other operations. The floating point ALU 412 of one embodiment includes a 64 bit by 64 bit floating point divider to execute divide, square root, and remainder micro-ops. For embodiments of the present disclosure, instructions involving a floating point value may be handled with the floating point hardware.

In one embodiment, the ALU operations go to the high-speed ALU execution units 416, 418. The fast ALUs 416, 418, of one embodiment can execute fast operations with an effective latency of half a clock cycle. For one embodiment, most complex integer operations go to the slow ALU 410 as the slow ALU 410 includes integer execution hardware for long latency type of operations, such as a multiplier, shifts, flag logic, and branch processing. Memory load/store operations are executed by the AGUs 412, 414. For one embodiment, the integer ALUs 416, 418, 420, are described in the context of performing integer operations on 64 bit data operands. In alternative embodiments, the ALUs 416, 418, 420, can be implemented to support a variety of data bits including 16, 32, 128, 256, etc. Similarly, the floating point units 412, 414, can be implemented to support a range of operands having bits of various widths. For one embodiment, the floating point units 412, 414, can operate on 128 bits wide packed data operands in conjunction with SIMD and multimedia instructions.

In one embodiment, the uops schedulers 402, 404, 406, dispatch dependent operations before the parent load has finished executing. As uops are speculatively scheduled and executed in processor 400, the processor 400 also includes logic to handle memory misses. If a data load misses in the data cache, there can be dependent operations in flight in the pipeline that have left the scheduler with temporarily incorrect data. A replay mechanism tracks and re-executes instructions that use incorrect data. Only the dependent operations need to be replayed and the independent ones are allowed to complete. The schedulers and replay mechanism of one embodiment of a processor are also designed to catch instruction sequences for text string comparison operations.

The processor 400 also includes logic to implement dynamic cache hash changes between SNCs according to one embodiment. In one embodiment, the execution block 411 of processor 400 may include a microcontroller (MCU), to perform dynamic cache hash changes between SNCs according to the description herein.

The term "registers" may refer to the on-board processor storage locations that are used as part of instructions to identify operands. In other words, registers may be those that are usable from the outside of the processor (from a programmer's perspective). However, the registers of an embodiment should not be limited in meaning to a particular type of circuit. Rather, a register of an embodiment is capable of storing and providing data, and performing the functions described herein. The registers described herein can be implemented by circuitry within a processor using any number of different techniques, such as dedicated physical registers, dynamically allocated physical registers using register renaming, combinations of dedicated and dynamically allocated physical registers, etc. In one embodiment, integer registers store thirty-two bit integer data. A register file of one embodiment also contains eight multimedia SIMD registers for packed data.

For the discussions herein, the registers are understood to be data registers designed to hold packed data, such as 64 bits wide MMX™ registers (also referred to as 'mm' registers in some instances) in microprocessors enabled with MMX technology from Intel Corporation of Santa Clara, Calif. These MMX registers, available in both integer and floating point forms, can operate with packed data elements that accompany SIMD and SSE instructions. Similarly, 128 bits wide XMM registers relating to SSE2, SSE3, SSE4, or beyond (referred to generically as "SSEx") technology can also be used to hold such packed data operands. In one embodiment, in storing packed data and integer data, the registers do not need to differentiate between the two data types. In one embodiment, integer and floating point are either contained in the same register file or different register files. Furthermore, in one embodiment, floating point and integer data may be stored in different registers or the same registers.

Figure 5:
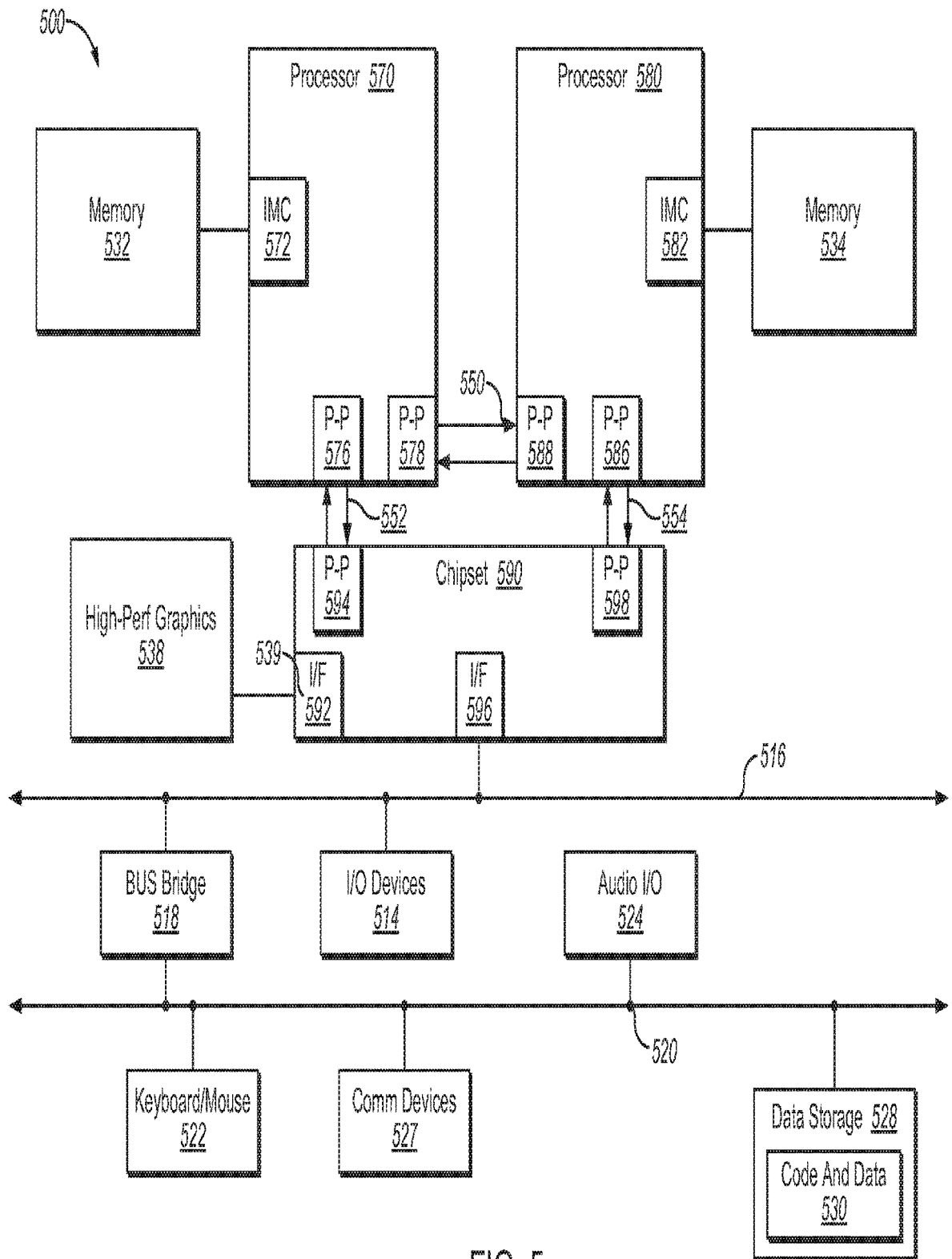
FIG. 5 is a block diagram of a computer system according to one implementation.

Embodiments may be implemented in many different system types. Referring now to FIG. 5, shown is a block diagram of a multiprocessor system 500 in accordance with an implementation. As shown in FIG. 5, multiprocessor system 500 is a point-to-point interconnect system, and includes a first processor 570 and a second processor 580 coupled via a point-to-point interconnect 550. As shown in FIG. 5, each of processors 570 and 580 may be multicore processors, including first and second processor cores (i.e., processor cores 574a and 574b and processor cores 584a and 584b), although potentially many more cores may be present in the processors. The processors each may include hybrid write mode logics in accordance with an embodiment of the present. The embodiments of the page additions and content copying can be implemented in the processor 570, processor 580, or both.

While shown with two processors 570, 580, it is to be understood that the scope of the present disclosure is not so limited. In other implementations, one or more additional processors may be present in a given processor.

Processors 570 and 580 are shown including integrated memory controller units 572 and 582, respectively. Processor 570 also includes as part of its bus controller units point-to-point (P-P) interfaces 576 and 588; similarly, second processor 580 includes P-P interfaces 586 and 588. Processors 570, 580 may exchange information via a point-to-point (P-P) interface 550 using P-P interface circuits 578, 588. As shown in FIG. 5, IMCs 572 and 582 couple the processors to respective memories, namely a memory 532 and a memory 534, which may be portions of main memory locally attached to the respective processors.

Processors 570, 580 may each exchange information with a chipset 590 via individual P-P interfaces 552, 554 using point to point interface circuits 576, 594, 586, 598. Chipset 590 may also exchange information with a high-performance graphics circuit 538 via a high-performance graphics interface 539.

A shared cache (not shown) may be included in either processor or outside of both processors, yet connected with the processors via P-P interconnect, such that either or both processors' local cache information may be stored in the shared cache if a processor is placed into a low power mode.

Chipset 590 may be coupled to a first bus 516 via an interface 596. In one embodiment, first bus 516 may be a Peripheral Component Interconnect (PCI) bus, or a bus such as a PCI Express bus or another third generation I/O interconnect bus, although the scope of the present disclosure is not so limited.

As shown in FIG. 5, various I/O devices 514 may be coupled to first bus 516, along with a bus bridge 518 which couples first bus 516 to a second bus 520. In one embodiment, second bus 520 may be a low pin count (LPC) bus. Various devices may be coupled to second bus 520 including, for example, a keyboard and/or mouse 522, communication devices 527 and a storage unit 528 such as a disk drive or other mass storage device which may include instructions/code and data 530, in one embodiment. Further, an audio I/O 524 may be coupled to second bus 520. Note that other architectures are possible. For example, instead of the point-to-point architecture of FIG. 5, a system may implement a multi-drop bus or other such architecture.

Figure 6:
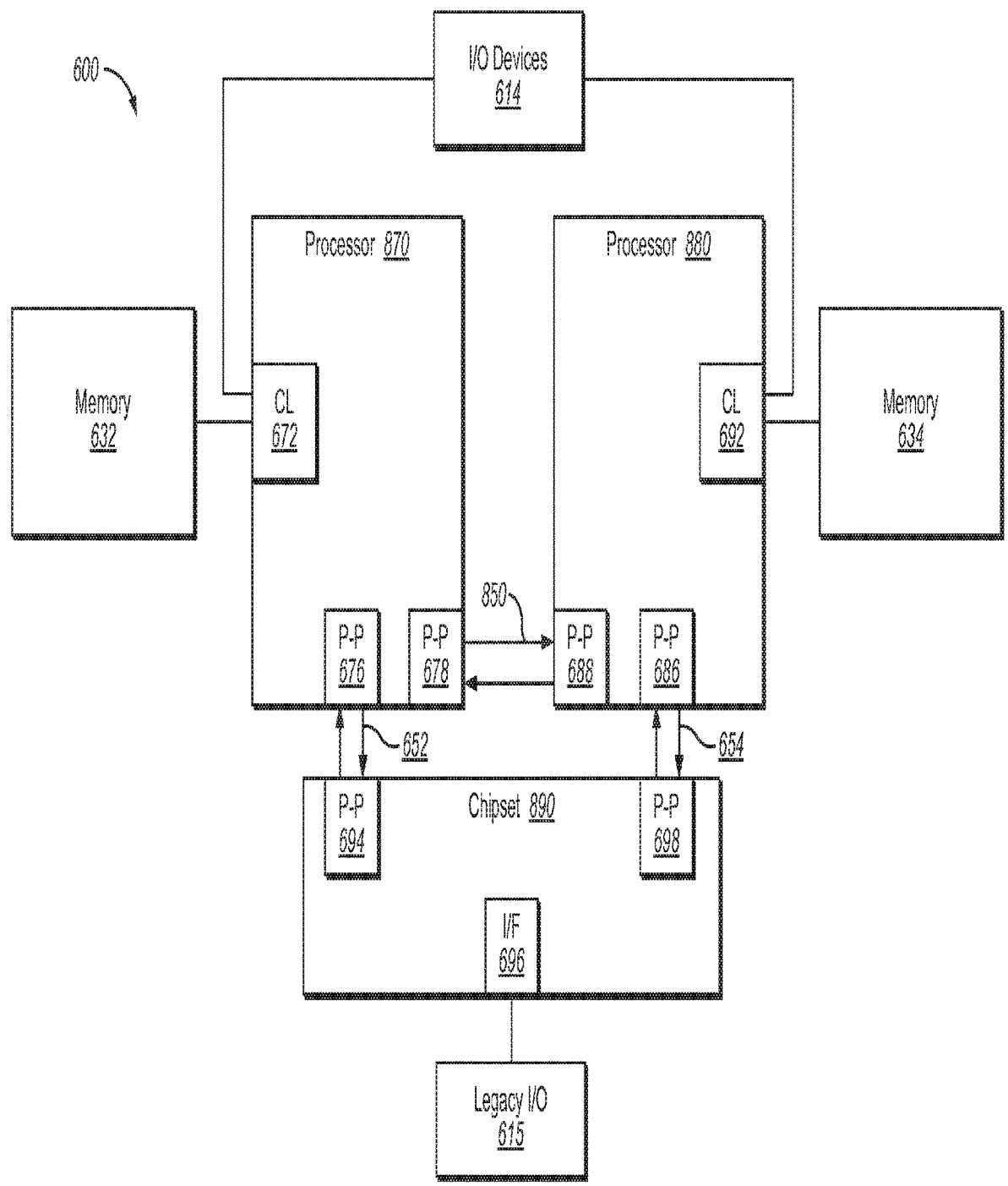
FIG. 6 is a block diagram of a computer system according to another implementation.

Referring now to FIG. 6, shown is a block diagram of a third system 600 in accordance with an embodiment of the present invention. Like elements in FIGS. 5 and 6 bear like reference numerals, and certain aspects of FIG. 5 have been omitted from FIG. 6 in order to avoid obscuring other aspects of FIG. 6.

FIG. 6 illustrates that the processors 670, 680 may include integrated memory and I/O control logic ("CL") 672 and 682, respectively. For at least one embodiment, the CL 672, 682 may include integrated memory controller units such as described herein. In addition. CL 672, 682 may also include I/O control logic. FIG. 6 illustrates that the memories 632, 634 are coupled to the CL 672, 682, and that I/O devices 614 are also coupled to the control logic 672, 682. Legacy I/O devices 615 are coupled to the chipset 690. The embodiments of the page additions and content copying can be implemented in processor 670, processor 680, or both.

Figure 7:
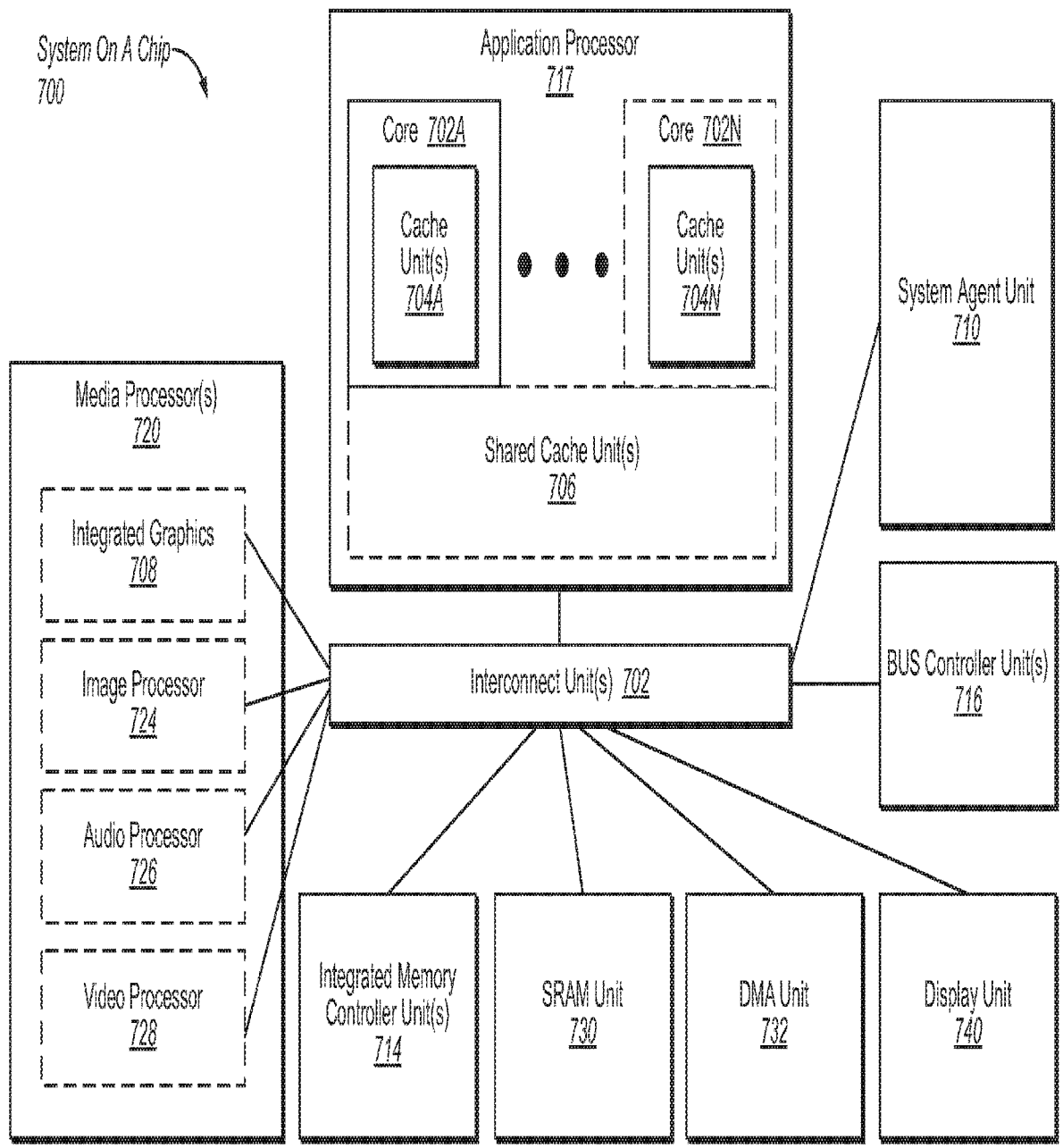
FIG. 7 is a block diagram of a system-on-a-chip according to one implementation.

FIG. 7 is an exemplary system on a chip (SoC) 700 that may include one or more of the cores 702. Other system designs and configurations known in the arts for laptops, desktops, handheld PCs, personal digital assistants, engineering workstations, servers, network devices, network hubs, switches, embedded processors, digital signal processors (DSPs), graphics devices, video game devices, set-top boxes, micro controllers, cell phones, portable media players, hand held devices, and various other electronic devices, are also suitable. In general, a huge variety of systems or electronic devices capable of incorporating a processor and/or other execution logic as disclosed herein are generally suitable.

FIG. 7 is a block diagram of a SoC 700 in accordance with an embodiment of the present disclosure. Dashed lined boxes are features on more advanced SoCs. In FIG. 7 an interconnect unit(s) 702 is coupled to: an application processor 717 which includes a set of one or more cores 702A-N and shared cache unit(s) 706; a system agent unit 710; a bus controller unit(s) 716; an integrated memory controller unit(s) 714; a set or one or more media processors 720 which may include integrated graphics logic 708, an image processor 724 for providing still and/or video camera functionality, an audio processor 726 for providing hardware audio acceleration, and a video processor 728 for providing video encode/decode acceleration; a static random access memory (SRAM) unit 730; a direct memory access (DMA) unit 732; and a display unit 740 for coupling to one or more external displays. The embodiments of the pages additions and content copying can be implemented in SoC 700.

Figure 8:
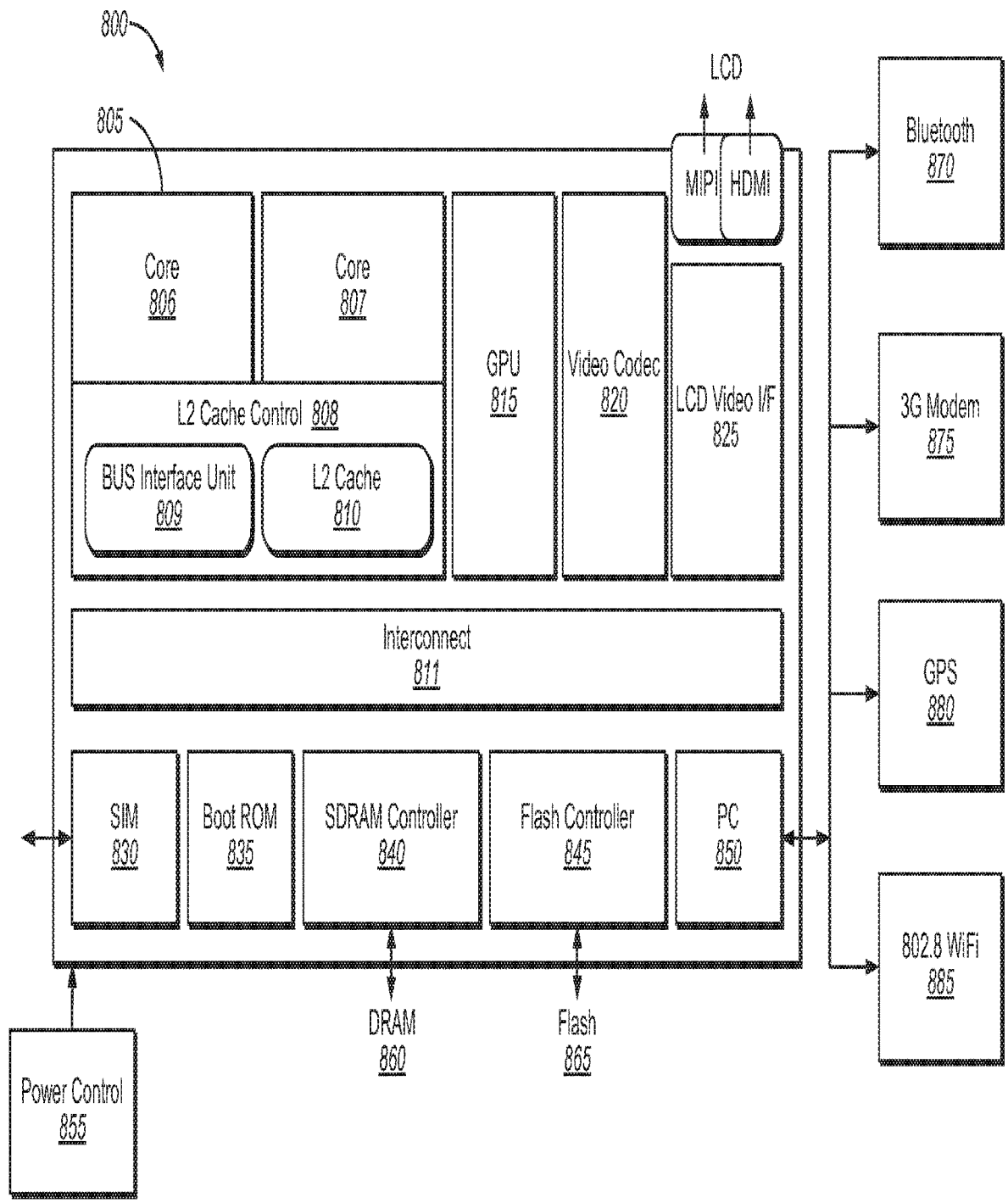
FIG. 8 illustrates another implementation of a block diagram for a computing system according to one implementation.

Turning next to FIG. 8, an embodiment of a system on-chip (SoC) design in accordance with embodiments of the disclosure is depicted. As an illustrative example, SoC 800 is included in user equipment (UE). In one embodiment, UE refers to any device to be used by an end-user to communicate, such as a hand-held phone, smartphone, tablet, ultra-thin notebook, notebook with broadband adapter, or any other similar communication device. A UE may connect to a base station or node, which can correspond in nature to a mobile station (MS) in a GSM network. The embodiments of the page additions and content copying can be implemented in SoC 800.

Here, SoC 800 includes 2 cores—806 and 807. Similar to the discussion above, cores 806 and 807 may conform to an Instruction Set Architecture, such as a processor having the Intel® Architecture Core™, an Advanced Micro Devices, Inc. (AMD) processor, a MIPS-based processor, an ARM-based processor design, or a customer thereof, as well as their licensees or adopters. Cores 806 and 807 are coupled to cache control 808 that is associated with bus interface unit 809 and L2 cache 810 to communicate with other parts of system 800. Interconnect 811 includes an on-chip interconnect, such as an IOSF, AMBA, or other interconnects discussed above, which can implement one or more aspects of the described disclosure.

Interconnect 811 provides communication channels to the other components, such as a Subscriber Identity Module (SIM) 830 to interface with a SIM card, a boot ROM 835 to hold boot code for execution by cores 806 and 807 to initialize and boot SoC 800, a SDRAM controller 840 to interface with external memory (e.g. DRAM 860), a flash controller 845 to interface with non-volatile memory (e.g. Flash 865), a peripheral control 850 (e.g. Serial Peripheral Interface) to interface with peripherals, video codecs 820 and Video interface 825 to display and receive input (e.g. touch enabled input), GPU 815 to perform graphics related computations, etc. Any of these interfaces may incorporate aspects of the embodiments described herein.

In addition, the system illustrates peripherals for communication, such as a Bluetooth module 870, 3G modem 875, GPS 880, and Wi-Fi 885. Note as stated above, a UE includes a radio for communication. As a result, these peripheral communication modules may not all be included. However, in a UE some form of a radio for external communication should be included.

Figure 9:
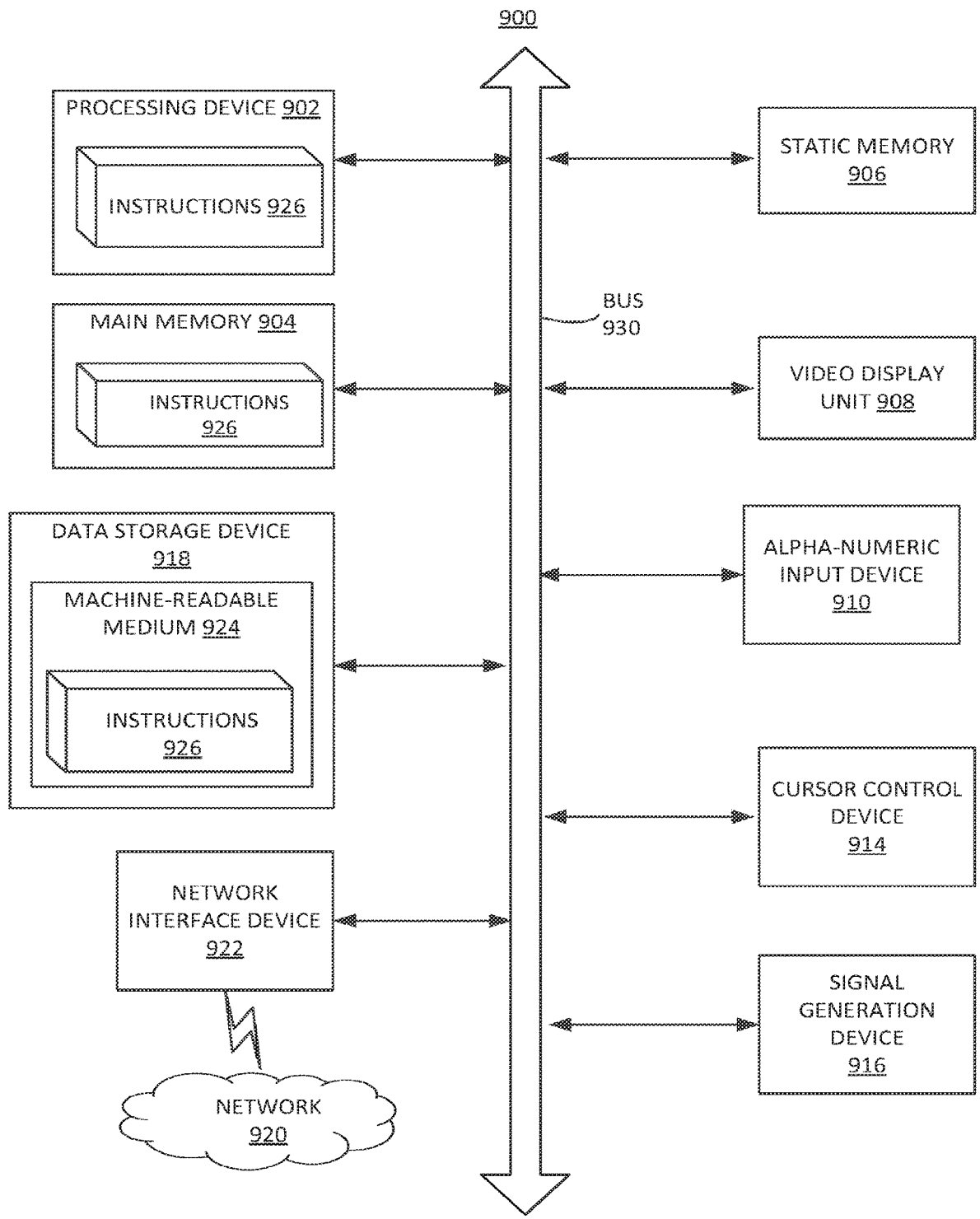
FIG. 9 illustrates another implementation of a block diagram for a computing system according to one implementation.

FIG. 9 illustrates a diagrammatic representation of a machine in the example form of a computing system 900 within which a set of instructions, for causing the machine to perform any one or more of the methodologies discussed herein, may be executed. In alternative embodiments, the machine may be connected (e.g., networked) to other machines in a LAN, an intranet, an extranet, or the Internet. The machine may operate in the capacity of a server or a client device in a client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein. The embodiments of the page additions and content copying can be implemented in computing system 900.

The computing system 900 includes a processing device 902, main memory 904 (e.g., read-only memory (ROM), flash memory, dynamic random access memory (DRAM) (such as synchronous DRAM (SDRAM) or DRAM (RDRAM), etc.), a static memory 906 (e.g., flash memory, static random access memory (SRAM), etc.), and a data storage device 918, which communicate with each other via a bus 930.

Processing device 902 represents one or more general-purpose processing devices such as a microprocessor, central processing unit, or the like. More particularly, the processing device may be complex instruction set computing (CISC) microprocessor, reduced instruction set computer (RISC) microprocessor, very long instruction word (VLIW) microprocessor, or processor implementing other instruction sets, or processors implementing a combination of instruction sets. Processing device 902 may also be one or more special-purpose processing devices such as an application specific integrated circuit (ASIC), a field programmable gate array (FPGA), a digital signal processor (DSP), network processor, or the like. In one embodiment, processing device 902 may include one or processor cores. The processing device 902 is configured to execute the processing logic 926 for performing the operations discussed herein. In one embodiment, processing device 902 can be part of a computing system. Alternatively, the computing system 900 can include other components as described herein. It should be understood that the core may support multithreading (executing two or more parallel sets of operations or threads), and may do so in a variety of ways including time sliced multithreading, simultaneous multithreading (where a single physical core provides a logical core for each of the threads that physical core is simultaneously multithreading), or a combination thereof (e.g., time sliced fetching and decoding and simultaneous multithreading thereafter such as in the Intel® Hyperthreading technology).

The computing system 900 may further include a network interface device 908 communicably coupled to a network 920. The computing system 900 also may include a video display unit 910 (e.g., a liquid crystal display (LCD) or a cathode ray tube (CRT)), an alphanumeric input device 910 (e.g., a keyboard), a cursor control device 914 (e.g., a mouse), a signal generation device 916 (e.g., a speaker), or other peripheral devices. Furthermore, computing system 900 may include a graphics processing unit 922, a video processing unit 928 and an audio processing unit 932. In another embodiment, the computing system 900 may include a chipset (not illustrated), which refers to a group of integrated circuits, or chips, that are designed to work with the processing device 902 and controls communications between the processing device 902 and external devices. For example, the chipset may be a set of chips on a motherboard that links the processing device 902 to very high-speed devices, such as main memory 904 and graphic controllers, as well as linking the processing device 902 to lower-speed peripheral buses of peripherals, such as USB, PCI or ISA buses.

The data storage device 918 may include a computer-readable storage medium 924 on which is stored software 926 embodying any one or more of the methodologies of functions described herein. The software 926 may also reside, completely or at least partially, within the main memory 904 as instructions 926 and/or within the processing device 902 as processing logic 926 during execution thereof by the computing system 900; the main memory 904 and the processing device 902 also constituting computer-readable storage media.

The computer-readable storage medium 924 may also be used to store instructions 926 utilizing the processing device 902, such as described with respect to FIG. 1, and/or a software library containing methods that call the above applications. While the computer-readable storage medium 924 is shown in an example embodiment to be a single medium, the term "computer-readable storage medium" should be taken to include a single medium or multiple media (e.g., a centralized or distributed database, and/or associated caches and servers) that store the one or more sets of instructions. The term "computer-readable storage medium" shall also be taken to include any medium that is capable of storing, encoding or carrying a set of instruction for execution by the machine and that cause the machine to perform any one or more of the methodologies of the present embodiments. The term "computer-readable storage medium" shall accordingly be taken to include, but not be limited to, solid-state memories, and optical and magnetic media.

The following examples pertain to further embodiments.

Example 1 is a processor including: 1) a first register array, wherein a first set of variables, a second set of variables, and a third set of variables are stored in a first register array; 2) a decoder to: a) receive a request from an application to perform a single instruction multiple data (SIMD) operation; and b) decode the request; and 3) an execution unit to perform the following in response the request: a) perform an operation on a first set of variables, wherein the first set of variables comprises a first input value and a first register value and wherein the first register value is stored at a first array location in the register array; b) perform the operation on a second set of variables, wherein the second set of variables comprises a second input value and the first register value and wherein the first register value is stored at the first array location in the register array; c) vectorize the operation on the first set of variables and the second set of variables; d) perform the operation on the first set of variables and the operation on the second set of variables in parallel to obtain a first operation value for the first set of variables and a second operation value for the second set of variables; e) perform a horizontal add operation on the first operation value and the second operation value to obtain a first result value; and f) write the first result value to the first location in the register array.

In Example 2, the processor of Example 1, wherein the execution unit is further to: a) perform the operation on a third set of variables, wherein the third set of variables comprises a third input value and a second register value and wherein the second register value is stored at a second array location in the register array; b) perform the operation on a fourth set of variables, wherein the fourth set of variables comprises a fourth input value and the second register value and wherein the second register value is stored at the second array location in the register array; c) vectorize the operation on the first set of variables, the operation on the second set of variables, the operation on the third set of variables, and the operation on the fourth set of variables; d) perform the operation on the first set of variables, the operation on the second set of variables, the operation on the third set of variables, and the operation on the fourth set of variables in parallel to obtain: i) the first operation value for the first set of variables, ii) the second operation value for the second set of variables; iii) a third operation value for the third set of variables; and iv) a fourth operation value for the fourth set of variables; e) perform the horizontal add operation on the third operation value and the fourth operation value to obtain a second result value; and f) write the second result value to the second register array location in the second register array location.

In Example 3, the processor of Example 2, wherein the execution unit is further to: a) perform the operation on a fifth set of variables, wherein the fifth set of variables comprises a fifth input value and a third register value and wherein the third register value is stored at a third array location in the register array; b) vectorize the operation on the first set of variables, the operation on the second set of variables, the operation on the third set of variables, the operation on the fourth set of variables, and the operation on the fifth set of variables; c) perform the operation on the first set of variables, the operation on the second set of variables, the operation on the third set of variables, the operation on the fourth set of variables, and the operation on the fifth set of variables in parallel to obtain: i) the first operation value for the first set of variables, ii) the second operation value for the second set of variables; iii) the third operation value for the third set of variables; iv) the fourth operation value for the fourth set of variables; and v) a fifth operation value for the fifth set of variables; and d) write the fifth operation value to the third register location in the register array.

In Example 4, the processor of Example 1, wherein the execution unit is further to: a) receive, from a software application, a request to perform the operation on a third set of variables, wherein the third set of variables comprises a third input value and a second register value, and wherein the register value is stored at a second register location in the register array; b) vectorize the operation on the first set of variables, the operation on the second set of variables, and the operation on the third set of variables in parallel; c) perform the operation on the first set of variables, the operation on the second set of variables, and the operation on the third set of variables in parallel to obtain: i) the first operation value for the first set of variables, ii) the second operation value for the second set of variables; and iii) a third operation value for the third set of variables; and d) write the third operation value to the second register location in the register array.

Various embodiments may have different combinations of the structural features described above. For instance, all optional features of the processors and methods described above may also be implemented with respect to a system described herein and specifics in the examples may be used anywhere in one or more embodiments.

Example 5 is a processor including: 1) a first register array, wherein a first set of variables, a second set of variables, and a third set of variables are stored in a first register array; 2) a decoder to: a) receive a request from an application to perform a single instruction multiple data (SIMD) operation; and b) decode the request; and 3) a processor core to, in response to the request: a) perform an operation on a first set of variables, wherein the first set of variables comprises a first input value and a first register value, and wherein the first register value is stored at a first register array location of the first register array; b) perform the operation on a second set of variables, wherein the second set of variables comprises a second input value and the first register value, and wherein the first register value is stored at a second register array location of the first register array; and c) perform the operation on a third set of variables, wherein the third set of variables comprises a third input value and a second register value, and wherein the second register value is stored at a third register array location of the first register array; d) perform the operation on the first set of variables to obtain a first operation value; e) perform the operation on the second set of variables to obtain a second operation value; f) perform the operation on the third set of variables to obtain a third operation value, wherein the operation on the first, second, and third set of variables is performed in parallel; g) associate the first operation value with the first register array location; h) associate the second operation value with the second register array location; i) associate the third operation value with the third register array location; j) determine that the first register array location and the second register array location are for a same register array location; k) perform a horizontal add operation on the first operation value and the second operation value to obtain a result value; l) write the result value to the first register array location; and m) write the third operation value to the third register array location.

In Example 6, the processor of Example 5, wherein the processor core is further to vectorize the operation on the first set of variables, the operation on the second set of variables, and the operation on the third set of variables to perform the operation on the first, second, and third set of variables in parallel.

In Example 7, the processor of Example 5, wherein the processor core is further to: a) store the first register value and the first register array location in the first register array location; b) store the first register value and the first register array location in the second register array location; and c) store the second register value and the second register array location in a third register array location.

In Example 8, the processor of Example 7, wherein the processor core is further to: a) perform the operation on the first set of variables using the first register value in the first register array location, b) perform the operation on the second set of variables using the first register value in the second register array location, and c) perform the operation on the third set of variables using the second register value in the third register array location.

In Example 9, the processor of Example 5, further comprising an operation register array, wherein the processor core is further to: 1) store the first operation value and the first register array location in a first register array of the operation register array; 2) store the second operation value and the second register array location in a second register array location of the operation register array; 3) store the third operation value and the third register array location in a third register array location of the operation register array; and 4) determine that the first register array location for the first register array location and the second register array location are the same register array location.

In Example 10, the processor of Example 9, wherein the processor core is further to perform the horizontal add operation on first operations value and the second operations value in response to the first register array location for the first register array location and the second register array location for the second register array location being the same register array location.

In Example 11, the processor of Example 10, wherein the processor core is further to: a) store the result of the horizontal add operation in the second register array location of the operation register array; b) generate a first write mask for second register array location; c) generate a second write mask for third register array location; and d) write the values in the second register array location and the third register array location with write masks to memory locations of a memory device associated with the second register array location and the third register array location.

In Example 12, the processor of Example 11, wherein the first write mask comprises a string of bits indicating a first memory location for the first operation register array location and a second memory location for the second operation register array location are the same memory location.

In Example 13, the processor of Example 12, wherein the first memory location and the second memory location are at non-contiguous locations in the memory device.

In Example 14, the processor of Example 5, wherein the operation is an addition operation.

Various embodiments may have different combinations of the structural features described above. For instance, all optional features of the processors and methods described above may also be implemented with respect to a system described herein and specifics in the examples may be used anywhere in one or more embodiments.

Example 15 is a method including: 1) performing, by a processor, an operation on a first set of variables to obtain a first operation value; 2) performing, by the processor, the operation on a second set of variables to obtain a second operation value; 3) performing, by the processor, the operation on a third set of variables to obtain a third operation value, wherein the operation on the first set of variables, the operation on second set of variables, and the operation on third set of variables is performed in parallel; 4) associating, by the processor, the first operation value with a first register array location at a register array; 5) associating, by the processor, the second operation value with a second register array location at the register array; 6) associating, by the processor, the third operation value with a third register array location at the register array; 7) determining, by the processor, that the first register array location and the second register array location are for a same register array location at the register array; 8) performing, by the processor, a horizontal add operation on the first operation value and the second operation value to obtain a result value; and 9) writing, by the processor, the result value and the third operation value to the first register array location.

In Example 16, the method of Example 15, further including receiving, from a software application, a request to: a) perform, by the processor, the operation on the first set of variables, wherein the first set of variables comprises a first input value and a first register value, and where the first register value is stored at the first register array location; b) perform, by the processor, the operation on the second set of variables, wherein the second set of variables comprises a second input value and the first register value, and wherein the first register value is stored at the second register array; and c) perform, by the processor, the operation on the third set of variables, wherein the third set of variables comprises a third input value and the second register value, and wherein the second register value is stored at the third register array location.

In Example 17, the method of Example 15, further including vectorizing, by the processor, the operation on the first set of variables, the operation on the second set of variables, and the operation on the third set of variables in parallel.

In Example 18, the method of Example 15, further including: 1) generating, by the processor, an operation register array of operation cells; 2) storing, by the processor, the first operation value and the first register array location in a first operation cell of the operation register array; 3) storing, by the processor, the second operation value and the second register array location in a second operation cell of the operation register array; 4) storing, by the processor, the third operation value and the third register array location in a third operation cell of the operation register array; 5) determining, by the processor, the first register array location for the first operation cell and the second register array location for the second operation cell are the same register array location; and 6) performing, by the processor, the horizontal add operation on first operations value and the second operations value in response to the first register array location for the first operation cell and the second register array location for the second operation cell being the same register array location.

In Example 19, the method of Example 18, further including: 1) storing, by the processor, the result for the horizontal add operation in a second operation cell of the operation register array; 2) generating, by the processor, a first write mask for the second operation cell; 3) generating, by the processor, a second write mask for the third operation cell; and 4) writing, by the processor, the values in the second operation cell with the first write mask and the third operation cell with the second write mask to the register array locations associated with the second operation cell and the third operation cell, respectively.

In Example 20, the method of Example 19, wherein the first write mask comprises a string of bits indicating the first register array location for the first operation cell and the second register array location for the second operation cell are the same register array location.

While the present invention has been described with respect to a limited number of embodiments, those skilled in the art will appreciate numerous modifications and variations therefrom. It is intended that the appended claims cover all such modifications and variations as fall within the true spirit and scope of this present invention.

In the description herein, numerous specific details are set forth, such as examples of specific types of processors and system configurations, specific hardware structures, specific architectural and micro architectural details, specific register configurations, specific instruction types, specific system components, specific measurements/heights, specific processor pipeline stages and operation etc. in order to provide a thorough understanding of the present invention. It will be apparent, however, to one skilled in the art that these specific details need not be employed to practice the present invention. In other instances, well known components or methods, such as specific and alternative processor architectures, specific logic circuits/code for described algorithms, specific firmware code, specific interconnect operation, specific logic configurations, specific manufacturing techniques and materials, specific compiler implementations, specific expression of algorithms in code, specific power down and gating techniques/logic and other specific operational details of computer system have not been described in detail in order to avoid unnecessarily obscuring the present invention.

The embodiments are described with reference to dynamic cache hash changes between SNCs in specific integrated circuits, such as in computing platforms or microprocessors. The embodiments may also be applicable to other types of integrated circuits and programmable logic devices. For example, the disclosed embodiments are not limited to desktop computer systems or portable computers, such as the Intel® Ultrabooks™ computers. And may be also used in other devices, such as handheld devices, tablets, other thin notebooks, systems on a chip (SoC) devices, and embedded applications. Some examples of handheld devices include cellular phones, Internet protocol devices, digital cameras, personal digital assistants (PDAs), and handheld PCs. Embedded applications typically include a microcontroller, a digital signal processor (DSP), a system on a chip, network computers (NetPC), set-top boxes, network hubs, wide area network (WAN) switches, or any other system that can perform the functions and operations taught below. It is described that the system can be any kind of computer or embedded system. The disclosed embodiments may especially be used for low-end devices, like wearable devices (e.g., watches), electronic implants, sensory and control infrastructure devices, controllers, supervisory control and data acquisition (SCADA) systems, or the like. Moreover, the apparatuses, methods, and systems described herein are not limited to physical computing devices, but may also relate to software optimizations for energy conservation and efficiency. As will become readily apparent in the description below, the embodiments of methods, apparatuses, and systems described herein (whether in reference to hardware, firmware, software, or a combination thereof) are vital to a 'green technology' future balanced with performance considerations.

Although the embodiments herein are described with reference to a processor, other embodiments are applicable to other types of integrated circuits and logic devices. Similar techniques and teachings of embodiments of the present invention can be applied to other types of circuits or semiconductor devices that can benefit from higher pipeline throughput and improved performance. The teachings of embodiments of the present invention are applicable to any processor or machine that performs data manipulations. However, the present invention is not limited to processors or machines that perform 512 bit, 256 bit, 128 bit, 64 bit, 32 bit, or 16 bit data operations and can be applied to any processor and machine in which manipulation or management of data is performed. In addition, the description herein provides examples, and the accompanying drawings show various examples for the purposes of illustration. However, these examples should not be construed in a limiting sense as they are merely intended to provide examples of embodiments of the present invention rather than to provide an exhaustive list of all possible implementations of embodiments of the present invention.

Although the below examples describe instruction handling and distribution in the context of execution units and logic circuits, other embodiments of the present invention can be accomplished by way of a data or instructions stored on a machine-readable, tangible medium, which when performed by a machine cause the machine to perform functions consistent with at least one embodiment of the invention. In one embodiment, functions associated with embodiments of the present invention are embodied in machine-executable instructions. The instructions can be used to cause a general-purpose or special-purpose processor that is programmed with the instructions to perform the steps of the present invention. Embodiments of the present invention may be provided as a computer program product or software which may include a machine or computer-readable medium having stored thereon instructions which may be used to program a computer (or other electronic devices) to perform one or more operations according to embodiments of the present invention. Alternatively, operations of embodiments of the present invention might be performed by specific hardware components that contain fixed-function logic for performing the operations, or by any combination of programmed computer components and fixed-function hardware components.

Instructions used to program logic to perform embodiments of the invention can be stored within a memory in the system, such as DRAM, cache, flash memory, or other storage. Furthermore, the instructions can be distributed via a network or by way of other computer readable media. Thus a machine-readable medium may include any mechanism for storing or transmitting information in a form readable by a machine (e.g., a computer), but is not limited to, floppy diskettes, optical disks, Compact Disc, Read-Only Memory (CD-ROMs), and magneto-optical disks, Read-Only Memory (ROMs), Random Access Memory (RAM), Erasable Programmable Read-Only Memory (EPROM), Electrically Erasable Programmable Read-Only Memory (EEPROM), magnetic or optical cards, flash memory, or a tangible, machine-readable storage used in the transmission of information over the Internet via electrical, optical, acoustical or other forms of propagated signals (e.g., carrier waves, infrared signals, digital signals, etc.). Accordingly, the computer-readable medium includes any type of tangible machine-readable medium suitable for storing or transmitting electronic instructions or information in a form readable by a machine (e.g., a computer).

A design may go through various stages, from creation to simulation to fabrication. Data representing a design may represent the design in a number of manners. First, as is useful in simulations, the hardware may be represented using a hardware description language or another functional description language. Additionally, a circuit level model with logic and/or transistor gates may be produced at some stages of the design process. Furthermore, most designs, at some stage, reach a level of data representing the physical placement of various devices in the hardware model. In the case where conventional semiconductor fabrication techniques are used, the data representing the hardware model may be the data specifying the presence or absence of various features on different mask layers for masks used to produce the integrated circuit. In any representation of the design, the data may be stored in any form of a machine readable medium. A memory or a magnetic or optical storage such as a disc may be the machine readable medium to store information transmitted via optical or electrical wave modulated or otherwise generated to transmit such information. When an electrical carrier wave indicating or carrying the code or design is transmitted, to the extent that copying, buffering, or re-transmission of the electrical signal is performed, a new copy is made. Thus, a communication provider or a network provider may store on a tangible, machine-readable medium, at least temporarily, an article, such as information encoded into a carrier wave, embodying techniques of embodiments of the present invention.

A module as used herein refers to any combination of hardware, software, and/or firmware. As an example, a module includes hardware, such as a micro-controller, associated with a non-transitory medium to store code adapted to be executed by the micro-controller. Therefore, reference to a module, in one embodiment, refers to the hardware, which is specifically configured to recognize and/or execute the code to be held on a non-transitory medium. Furthermore, in another embodiment, use of a module refers to the non-transitory medium including the code, which is specifically adapted to be executed by the microcontroller to perform predetermined operations. And as can be inferred, in yet another embodiment, the term module (in this example) may refer to the combination of the microcontroller and the non-transitory medium. Often module boundaries that are illustrated as separate commonly vary and potentially overlap. For example, a first and a second module may share hardware, software, firmware, or a combination thereof, while potentially retaining some independent hardware, software, or firmware. In one embodiment, use of the term logic includes hardware, such as transistors, registers, or other hardware, such as programmable logic devices.

Use of the phrase 'configured to,' in one embodiment, refers to arranging, putting together, manufacturing, offering to sell, importing and/or designing an apparatus, hardware, logic, or element to perform a designated or determined task. In this example, an apparatus or element thereof that is not operating is still 'configured to' perform a designated task if it is designed, coupled, and/or interconnected to perform said designated task. As a purely illustrative example, a logic gate may provide a 0 or a 1 during operation. But a logic gate 'configured to' provide an enable signal to a clock does not include every potential logic gate that may provide a 1 or 0. Instead, the logic gate is one coupled in some manner that during operation the 1 or 0 output is to enable the clock. Note once again that use of the term 'configured to' does not require operation, but instead focus on the latent state of an apparatus, hardware, and/or element, where in the latent state the apparatus, hardware, and/or element is designed to perform a particular task when the apparatus, hardware, and/or element is operating.

Furthermore, use of the phrases 'to,' 'capable of/to,' and or 'operable to,' in one embodiment, refers to some apparatus, logic, hardware, and/or element designed in such a way to enable use of the apparatus, logic, hardware, and/or element in a specified manner. Note as above that use of to, capable to, or operable to, in one embodiment, refers to the latent state of an apparatus, logic, hardware, and/or element, where the apparatus, logic, hardware, and/or element is not operating but is designed in such a manner to enable use of an apparatus in a specified manner.

A value, as used herein, includes any known representation of a number, a state, a logical state, or a binary logical state. Often, the use of logic levels, logic values, or logical values is also referred to as 1's and 0's, which simply represents binary logic states. For example, a 1 refers to a high logic level and 0 refers to a low logic level. In one embodiment, a storage cell, such as a transistor or flash cell, may be capable of holding a single logical value or multiple logical values. However, other representations of values in computer systems have been used. For example the decimal number ten may also be represented as a binary value of 1010 and a hexadecimal letter A. Therefore, a value includes any representation of information capable of being held in a computer system.

Moreover, states may be represented by values or portions of values. As an example, a first value, such as a logical one, may represent a default or initial state, while a second value, such as a logical zero, may represent a non-default state. In addition, the terms reset and set, in one embodiment, refer to a default and an updated value or state, respectively. For example, a default value potentially includes a high logical value, i.e. reset, while an updated value potentially includes a low logical value, i.e. set. Note that any combination of values may be utilized to represent any number of states.

The embodiments of methods, hardware, software, firmware or code set forth above may be implemented via instructions or code stored on a machine-accessible, machine readable, computer accessible, or computer readable medium which are executable by a processing element. A non-transitory machine-accessible/readable medium includes any mechanism that provides (i.e., stores and/or transmits) information in a form readable by a machine, such as a computer or electronic system. For example, a non-transitory machine-accessible medium includes random-access memory (RAM), such as static RAM (SRAM) or dynamic RAM (DRAM); ROM; magnetic or optical storage medium; flash memory devices; electrical storage devices; optical storage devices; acoustical storage devices; other form of storage devices for holding information received from transitory (propagated) signals (e.g., carrier waves, infrared signals, digital signals); etc., which are to be distinguished from the non-transitory mediums that may receive information there from.

Instructions used to program logic to perform embodiments of the invention may be stored within a memory in the system, such as DRAM, cache, flash memory, or other storage. Furthermore, the instructions can be distributed via a network or by way of other computer readable media. Thus a machine-readable medium may include any mechanism for storing or transmitting information in a form readable by a machine (e.g., a computer), but is not limited to, floppy diskettes, optical disks, Compact Disc, Read-Only Memory (CD-ROMs), and magneto-optical disks, Read-Only Memory (ROMs), Random Access Memory (RAM), Erasable Programmable Read-Only Memory (EPROM), Electrically Erasable Programmable Read-Only Memory (EEPROM), magnetic or optical cards, flash memory, or a tangible, machine-readable storage used in the transmission of information over the Internet via electrical, optical, acoustical or other forms of propagated signals (e.g., carrier waves, infrared signals, digital signals, etc.). Accordingly, the computer-readable medium includes any type of tangible machine-readable medium suitable for storing or transmitting electronic instructions or information in a form readable by a machine (e.g., a computer)

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

In the foregoing specification, a detailed description has been given with reference to specific exemplary embodiments. It will, however, be evident that various modifications and changes may be made thereto without departing from the broader spirit and scope of the invention as set forth in the appended claims. The specification and drawings are, accordingly, to be regarded in an illustrative sense rather than a restrictive sense. Furthermore, the foregoing use of embodiment and other exemplarily language does not necessarily refer to the same embodiment or the same example, but may refer to different and distinct embodiments, as well as potentially the same embodiment.

Some portions of the detailed description are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared and otherwise manipulated. It has proven convenient at times, principally for reasons of common usage, to refer to these signals as bits, values, elements, symbols, characters, terms, numbers or the like. The blocks described herein can be hardware, software, firmware or a combination thereof.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "defining," "receiving," "determining," "issuing," "linking," "associating," "obtaining," "authenticating," "prohibiting," "executing," "requesting," "communicating," or the like, refer to the actions and processes of a computing system, or similar electronic computing device, that manipulates and transforms data represented as physical (e.g., electronic) quantities within the computing system's registers and memories into other data similarly represented as physical quantities within the computing system memories or registers or other such information storage, transmission or display devices.

The words "example" or "exemplary" are used herein to mean serving as an example, instance or illustration. Any aspect or design described herein as "example' or "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or." That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Moreover, use of the term "an embodiment" or "one embodiment" or "an implementation" or "one implementation" throughout is not intended to mean the same embodiment or implementation unless described as such. Also, the terms "first," "second," "third," "fourth," etc. as used herein are meant as labels to distinguish among different elements and may not necessarily have an ordinal meaning according to their numerical designation.

What is claimed is:

1. A system comprising:
   a memory device; and
   a processor coupled to the memory device, the processor comprising:
      a register array comprising a first cell that stores a first register value that identifies a first memory location and a second cell that stores a second register value that identifies a second memory location;
      a decoder circuit to:
         receive a single instruction multiple data (SIMD) instruction from an application, the SIMD instruction identifying the register array and an array of input values comprising at least a first input value and a second input value; and
         decode the SIMD instruction; and
      an execution unit circuit to perform the following in response the decoded SIMD instructions:
         perform an operation on the first input value and the first register value to obtain a first operation value;
         perform the operation on the second input value and the second register value to obtain a second operation value, wherein the operation on the first input value and the second input value are performed in parallel;
         determine that the operation on the first input value and the operation on the second input value are in conflict when the first register value and the second register value are the same; perform a horizontal add operation on the first operation value and the second operation value to obtain a first result value when the first register value and the second register value are the same; and
         write the first result value to the second memory location, wherein the second memory location and the first memory location are the same when the first register value and the second register value are the same.

2. The system of claim 1, wherein the register array comprises a third cell that stores a third register value that identifies a third memory location and a fourth cell that stores a fourth register value that identifies a fourth memory location, wherein the array of input values further comprises a third input value and a fourth input value, wherein the execution unit circuit is further to:
   perform the operation on the third input value and the third register value to obtain a third operation value;
   perform the operation on the fourth input value and the fourth register value to obtain a fourth operation value, wherein the operation on the first input value, the second input value, the third input value, and the fourth input value are performed in parallel;
   determine that the operation on the third input value and the operation on the fourth input value are in conflict when the third register value and the fourth register value are the same;
   perform the horizontal add operation on the third operation value and the fourth operation value to obtain a second result value when the third register value and the fourth register value are the same; and
   write the second result value to the fourth memory location, wherein the fourth memory location and the third memory location are the same when the third register value and the fourth register value are the same.

3. The system of claim 2, wherein the register array comprises a fifth cell that stores a fifth register value that identifies a fifth memory location, wherein the array of input values further comprises a fifth input value, wherein the execution unit circuit is further to:
   perform the operation on the fifth input value and the fifth register value to obtain a fifth operation value, wherein the operation on the first input value, the second input value, the third input value, the fourth input value, and the fifth input value are performed in parallel, and wherein the fifth register value is different from the first register value, the second register value, the third register value, and the fourth register value; and
   write the fifth operation value to the fifth memory location.

4. The system of claim 1, wherein the register array comprises a third cell that stores a third register value that identifies a third memory location, wherein the array of input values further comprises a third input value, wherein the execution unit circuit is further to:
   perform the operation on the third input value and the third register value to obtain a third operation value;
   determine that the operation on the first input value, the operation on the second input value, and the operation on the third input value are in conflict when the first register value, the second register value, and the third register value are the same;
   perform the horizontal add operation on the first operation value, the second operation value, and the third operation value to obtain the first result value when the first register value, the second register value, and the third register value are the same; and
   write the first result value to the third memory location, wherein the third memory location, the second memory location, and the first memory location are the same when the first register value, the second register value, and the third register value are the same.

5. A system comprising:
   a memory device; and
   a processor coupled to the memory device, the processor comprising:

a register array comprising a first element that stores a first register value that identifies a first memory location, a second element that stores a second register value that identifies a second memory location, and a third element that stores a third register value that identifies a third memory location;

a decoder circuit to:
 receive a single instruction multiple data (SIMD) instruction from an application, the SIMD instruction identifying the register array and an array of input values comprising at least a first input value, a second input value, and a third input value; and
 decode the SIMD instruction; and a processor core to:
 perform an operation on the first input value and the first register value to obtain a first operation value, and wherein the first register value is stored at a first location of the register array;
 perform the operation on the second input value and the second register value to obtain a second operation value, and wherein the second register value is stored at a second location of the register array; and
 perform the operation the third input value and the third register value, and wherein the second register value is stored at a third location of the register array, wherein the operation on the first, second, and third input values are performed in parallel;
 associate the first operation value with the first location;
 associate the second operation value with the second location;
 associate a third operation value with the third location;
 determine that the first register value and the second register value are the same value, wherein the third register value is different than the first register value and the second register value;
 perform a horizontal add operation on the first operation value and the second operation value to obtain a result value;
 write the result value to the second memory location, wherein the second memory location and the first memory location are the same when the first register value and the second register value are the same; and
 write the third operation value to the third memory location.

6. The system of claim 5, wherein the processor core is further to vectorize the operation on the first input value and the first register value, the operation on the second input value and the second register value, and the operation on the third input value and the third register value to perform the operation in parallel.

7. The system of claim 5, wherein the register array is an offset vector that stores offset values as the respective register value.

8. The system of claim 7, wherein the processor core is further to:
 perform the operation on the first input value and a first value stored at the first memory location identified by a first offset value in the offset vector,
 perform the operation on the second input value and a second value stored at the second memory location identified by a second offset value in the offset vector, and
 perform the operation on the third input value and a third value stored at the third memory location identified by a third offset value in the offset vector.

9. The system of claim 5, further comprising an operation register array, wherein the processor core is further to:
 store the first operation value in a first location of the operation register array;
 store the second operation value in a second location of the operation register array; and
 store the third operation value in a third location of the operation register array.

10. The system of claim 9, wherein the processor core is further to perform the horizontal add operation on the first operation value and the second operation value in response to the first register value and the second register value being the same value.

11. The system of claim 10, wherein the processor core is further to:
 store the result value of the horizontal add operation in the second location of the operation register array;
 generate a first write mask for the second location of the operation register array;
 generate a second write mask for third location of the operation register array; and
 write the values in the second location and the third location with write masks to the second and third memory locations of a memory device.

12. The system of claim 11, wherein the first write mask comprises a string of bits indicating that the first register value and the second register value identify a same memory location.

13. The system of claim 12, wherein the first memory location and the second memory location are at non-contiguous locations in the memory device.

14. The system of claim 5, wherein the operation is an addition operation.

15. A system comprising:
 a memory device; and
 a processor coupled to the memory device, wherein the processor is to:
  perform an operation on a first set of variables to obtain a first operation value;
  perform the operation on a second set of variables to obtain a second operation value;
  perform the operation on a third set of variables to obtain a third operation value, wherein the operation on the first set of variables, the operation on the second set of variables, and the operation on the third set of variables is performed in parallel;
  associate the first operation value with a first location at a register array;
  associate the second operation value with a second location at the register array;
  associating, by the processor, the third operation value with a third location at the register array;
  determine that a register value at the first location and a register value at the second location identify a same memory location;
  associate a horizontal add operation on the first operation value and the second operation value to obtain a result value; and
  write the result value to the same memory location identified by the second location and the third operation value to a third memory location identified by a register value at the third location.

16. The system of claim 15, wherein the processor is to execute a software application that is to request the operation to be performed on the first set of variables, the second set of variables, and the third set of variables, wherein the first set of variables comprises a first input value and a first register value stored at the first location, wherein the second set of variables comprises a second input value and the first register value stored at the second location, and wherein the third set of variables comprises a third input value and a second register value stored at the third location.

17. The system of claim 15, wherein the processor is further to vectorize the operation on the first set of variables, the operation on the second set of variables, and the operation on the third set of variables in parallel.

18. The system of claim 15, wherein the processor is further to:
   generate an operation register array of operation cells;
   store the first operation value in a first operation cell of the operation register array;
   store the second operation value in a second operation cell of the operation register array;
   store the third operation value in a third operation cell of the operation register array;
   determine the first location for the first operation cell and the second location for the second operation cell contain the same register value; and
   perform the horizontal add operation on the first operation value and the second operation value in response to the first location for the first operation cell and the second location for the second operation cell being the same register value.

19. The system of claim 18, wherein the processor is further to:
   store the result value for the horizontal add operation in the second operation cell of the operation register array;
   generate a first write mask for the second operation cell;
   generate a second write mask for the third operation cell; and
   write the result value in the second operation cell corresponding with the first write mask to the memory location identified by the second location and the third operation value in the third operation cell corresponding with the second write mask to the third memory location.

20. The system of claim 19, wherein the first write mask comprises a string of bits indicating the first location for the first operation cell and the second location for the second operation cell are the same register value corresponding to the same memory location.

* * * * *